United States Patent
Maruo et al.

(10) Patent No.: US 8,257,070 B2
(45) Date of Patent: Sep. 4, 2012

(54) SEAL APPARATUS OF GEAR PUMP

(75) Inventors: Ryohei Maruo, Kawasaki (JP);
Toshihiro Koizumi, Atsugi (JP);
Norihiro Saita, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 684 days.

(21) Appl. No.: 12/401,312

(22) Filed: Mar. 10, 2009

(65) Prior Publication Data

US 2009/0232690 A1 Sep. 17, 2009

(30) Foreign Application Priority Data

Mar. 13, 2008 (JP) ................................ 2008-063602

(51) Int. Cl.
*F03C 2/00* (2006.01)
*F03C 4/00* (2006.01)
*F04C 2/00* (2006.01)

(52) U.S. Cl. ........ 418/132; 418/104; 418/128; 418/129; 418/206.6

(58) Field of Classification Search .................. 418/104, 418/128–129, 132–133, 206.1–206.9; 277/650, 277/644

See application file for complete search history.

(56) References Cited

U.S. PATENT DOCUMENTS

| | | | | |
|---|---|---|---|---|
| 2,842,066 A | * | 7/1958 | Hilton ........................... | 418/132 |
| 3,068,804 A | * | 12/1962 | Thrap et al. ................. | 418/206.6 |
| 3,142,260 A | * | 7/1964 | Delbert ....................... | 418/206.6 |
| 3,213,800 A | * | 10/1965 | McAlvay et al. ........... | 418/206.6 |
| 3,482,524 A | * | 12/1969 | Marietta ....................... | 418/132 |
| 4,281,974 A | * | 8/1981 | Teruyama ..................... | 418/132 |
| 5,232,356 A | * | 8/1993 | Takeda et al. ................. | 418/132 |

FOREIGN PATENT DOCUMENTS

| | | |
|---|---|---|
| JP | 3-123993 U | 12/1991 |
| JP | 09025883 A * | 1/1997 |
| JP | 2006207415 A * | 8/2006 |

OTHER PUBLICATIONS

JP 09025883 A—Ozeki—Gear Pump or Motor, Jan. 28, 1997—English Translation.*

* cited by examiner

*Primary Examiner* — Theresa Trieu
(74) *Attorney, Agent, or Firm* — Foley & Lardner LLP

(57) ABSTRACT

A seal apparatus includes at least one pair of gears; a side plate arranged adjacent to the pair of gears; and a housing sandwiching the side plate. At least one of the side plate and the housing includes a shoulder portion. The seal apparatus further includes a seal member arranged between the housing and the side plate and arranged at the shoulder portion. The seal member separates a low pressure area from a high pressure area in a radial direction of the gear. The shoulder portion is located in the low pressure area. At least a part of the seal member faces the high pressure area. The seal apparatus further includes a backup member reinforcing the seal member and facing a tip portion of the shoulder portion; and a containing portion formed between a root portion of the shoulder portion and the seal member to be capable of containing a part of the seal member at least when the seal member is elastically deformed.

23 Claims, 28 Drawing Sheets

FIG.2
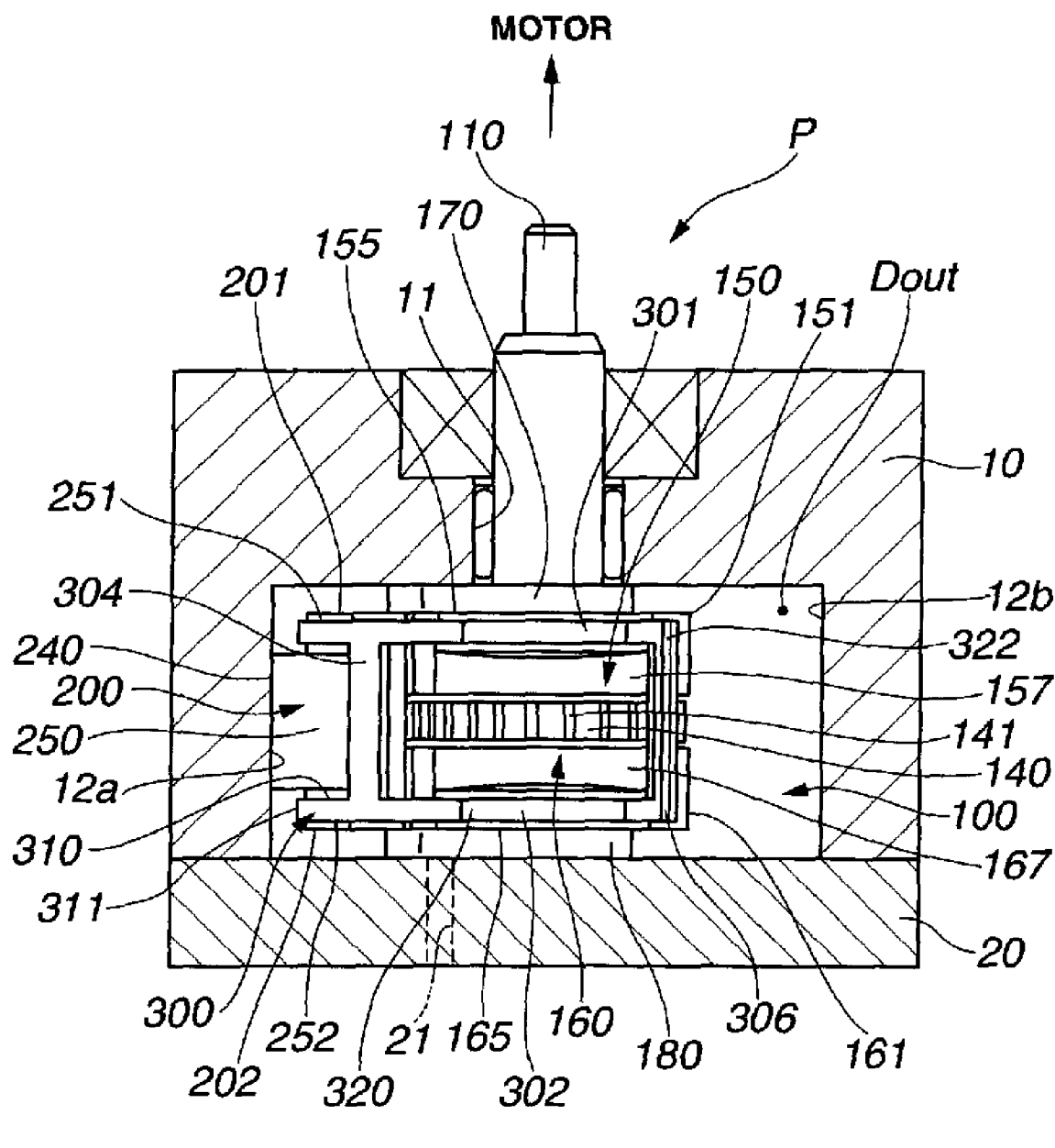
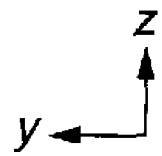

COMPARATIVE EXAMPLE

EMBODIMENT

SEAL APPARATUS OF GEAR PUMP

BACKGROUND OF THE INVENTION

The present invention relates to a seal apparatus of a gear pump which is favorably used as, for example, a hydraulic source of a brake system for vehicle.

Japanese Utility Model Application Publication No. H03 (1991)-123993 discloses a previously-proposed gear pump. The gear pump in this technique includes a drive shaft, a driven shaft, a pair of side plates and a seal member in a housing. Because the seal member is an elastic body, a backup ring having a higher hardness than the seal member is provided on a low-pressure side of the side plate (on an inner circumferential side of the side plate). Thereby, it is suppressed that the seal member is excessively deformed. The seal member and the backup ring are held to be sandwiched between the side plate and an inner surface of the housing.

SUMMARY OF THE INVENTION

However, in the above technique, in the case where a space between the side plate and the inner surface of the housing is large, there has been a possibility that the seal member is jammed (pushed) into a clearance between the backup ring and the inner surface of the housing or into a clearance between the backup ring and the side plate, and thereby the seal member is damaged.

On the other hand, in the case where the clearance between the backup ring and the inner surface of the housing and the clearance between the backup ring and the side plate are shortened by enlarging a diameter the backup ring in order to prevent this jamming (bitten state); the side plate is pressed by an elastic force of the backup ring, and thereby a friction between the side plate and a gear is increased.

It is therefore an object of the present invention to provide a seal apparatus of a gear pump, devised to prevent the jamming (bitten state) of the seal member and also to suppress the increase of friction.

According to one aspect of the present invention, there is provided a seal apparatus of a gear pump, comprising: at least one pair of gears meshing with each other; a side plate arranged adjacent to the pair of gears; a housing sandwiching the side plate and arranged to be opposed to the pair of gears, at least one of the side plate and the housing comprising a shoulder portion; a seal member arranged between the housing and the side plate and arranged at the shoulder portion, the seal member separating a low pressure area from a high pressure area in a radial direction of the gear, the shoulder portion being located in the low pressure area, at least a part of the seal member facing the high pressure area; a backup member reinforcing the seal member and facing a tip portion of the shoulder portion; and a containing portion formed between a root portion of the shoulder portion and the seal member to be capable of containing a part of the seal member at least when the seal member is elastically deformed.

According to another aspect of the present invention, there is provided a seal apparatus of a gear pump, comprising: at least one pair of gears meshing with each other; a side plate arranged adjacent to the pair of gears, the side plate comprising a shoulder portion; a housing sandwiching the side plate and arranged to be opposed to the pair of gears; a seal member arranged between the housing and the side plate and arranged at the shoulder portion, the seal member separating a low pressure area from a high pressure area in a radial direction of the gear; and a backup member reinforcing the seal member and arranged depending on a space formed between the housing and a tip portion of the shoulder portion, the backup member being configured to being elastically deformed by an elastic force of the seal member and thereby being pressed at least in a direction toward the housing and a direction toward a space formed between the backup member and the tip portion of the shoulder portion.

According to still another aspect of the present invention, there is provided a seal apparatus of a gear pump, comprising: a seal member attached to a member constituting the gear pump, the seal member being formed substantially in an L shape in cross section; and a backup ring provided in a groove of the seal member which forms the substantially L-shaped cross section of the seal member, the backup ring reinforcing the seal member, wherein the backup ring is arranged to face a low pressure area of the gear pump.

The other objects and features of this invention will become understood from the following description with reference to the accompanying drawings.

BRIEF DESCRIPTION OF THE DRAWINGS

FIG. 2 is a front view of the gear pump as viewed in x-axis positive direction, in the first embodiment.

DETAILED DESCRIPTION OF THE INVENTION

Figure 1:
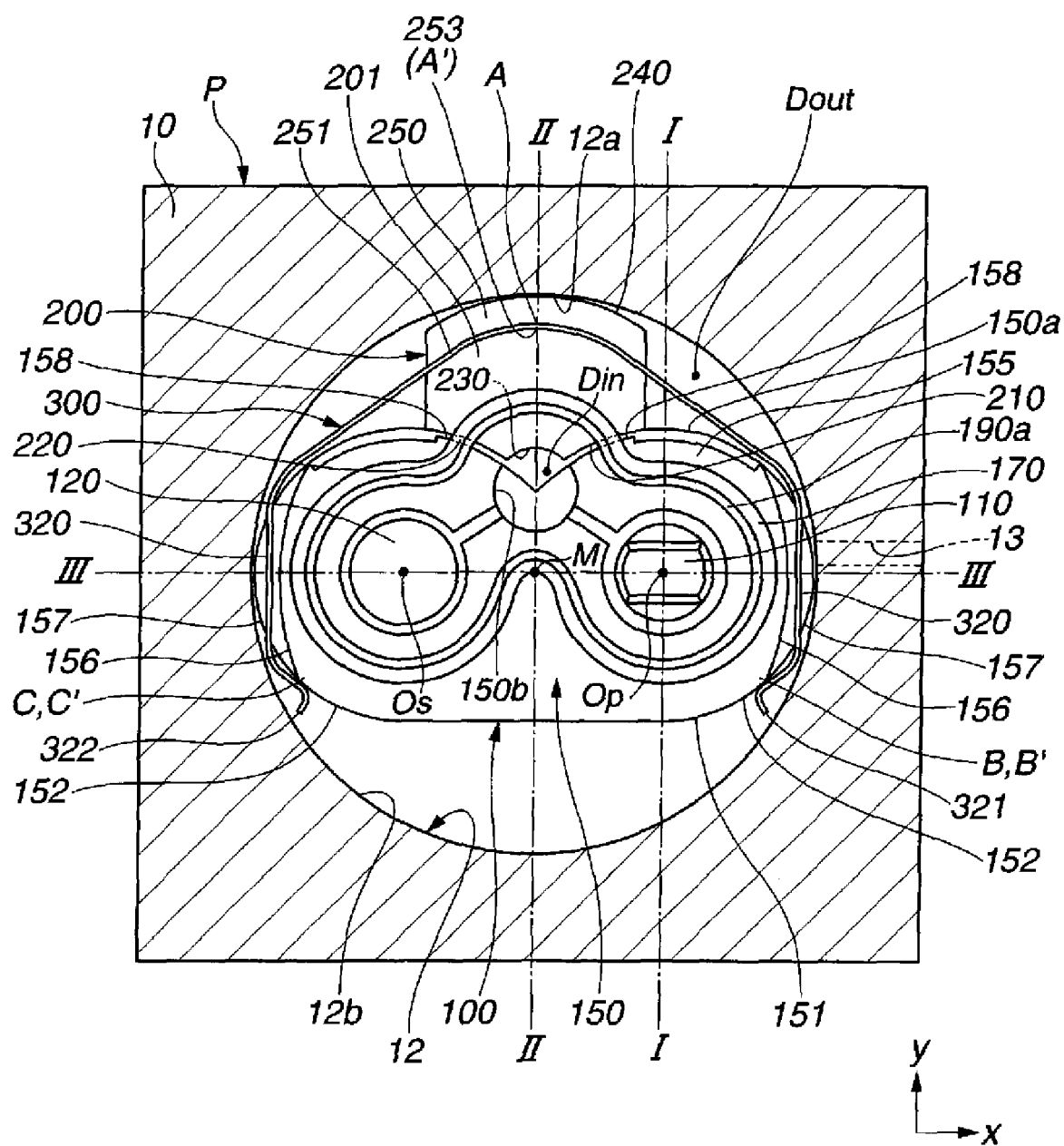
FIG. 1 is a front view of a gear pump as viewed from z-axis positive side, in a first embodiment according to the present invention.

Reference will hereinafter be made to the drawings in order to facilitate a better understanding of the present invention. Embodiments for a seal apparatus of gear pump according to the present invention will be explained below referring to the drawings.

First Embodiment

Figure 3:
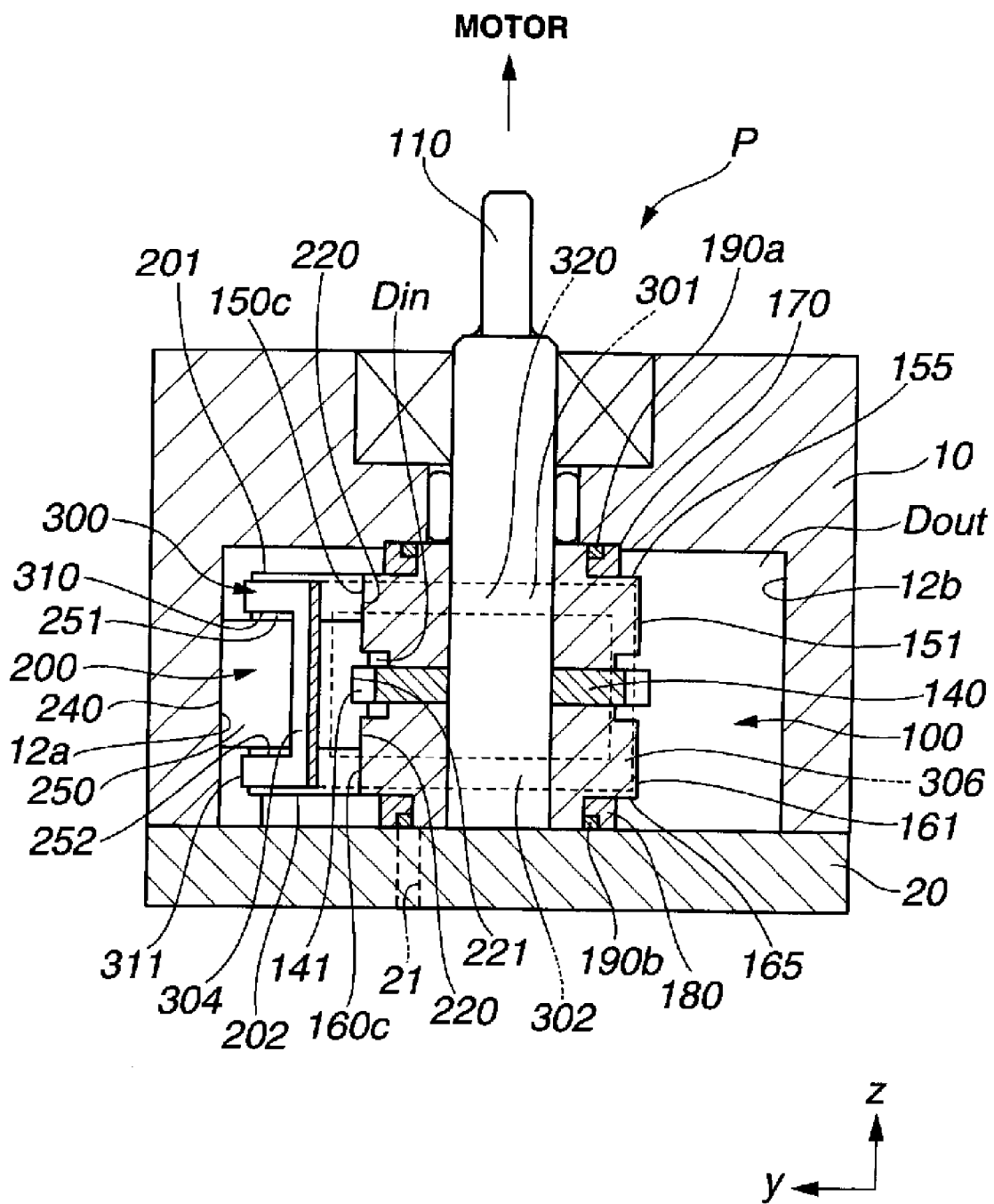
FIG. 3 is a cross-sectional view of FIG. 1, taken along a line I-I.

FIG. 1 is a front view of a gear pump P as viewed from z-axis positive side. FIG. 2 is a side view of the gear pump P as viewed in x-axis positive direction. FIG. 3 is a cross-sectional view of FIG. 1, taken along a line I-I. In FIGS. 1 and 2, only parts corresponding to a housing 10 and a housing cover 20 are shown in cross section.

Figure 4:
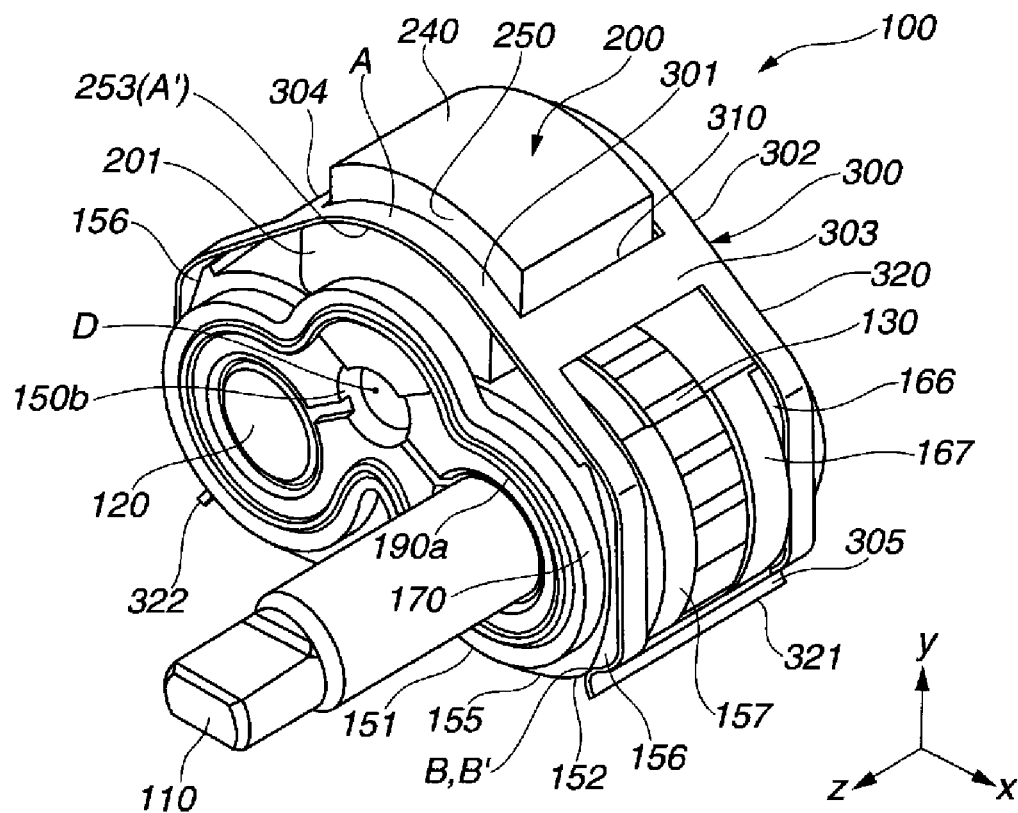
FIG. 4 is an oblique perspective view of a pump assembly in the first embodiment.
Figure 5:
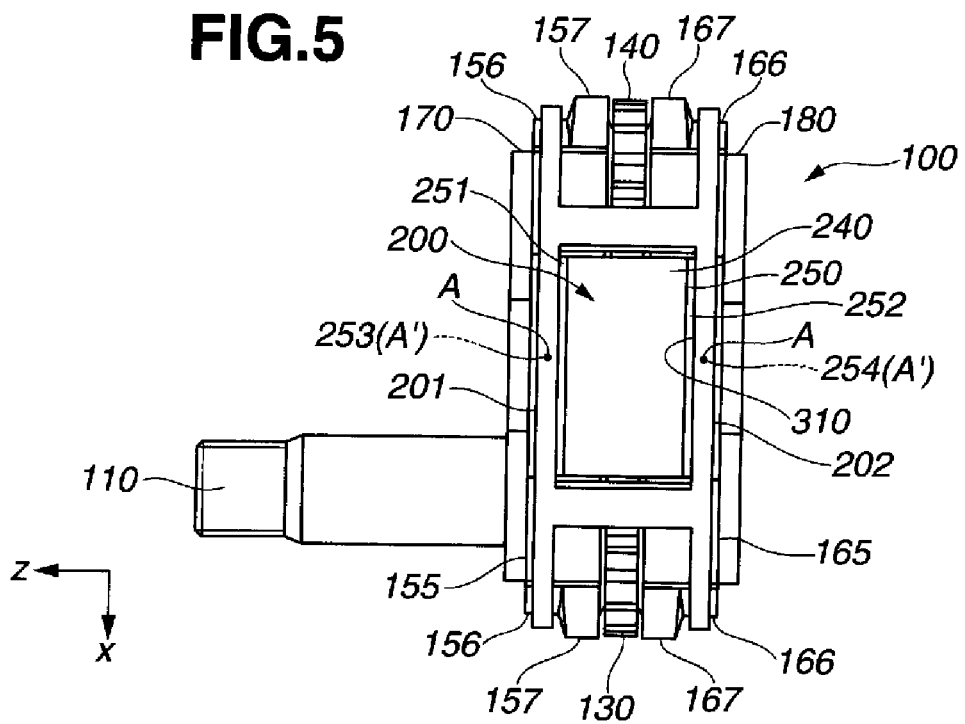
FIG. 5 is a front view of the pump assembly as viewed from y-axis positive side, in the first embodiment.
Figure 6:
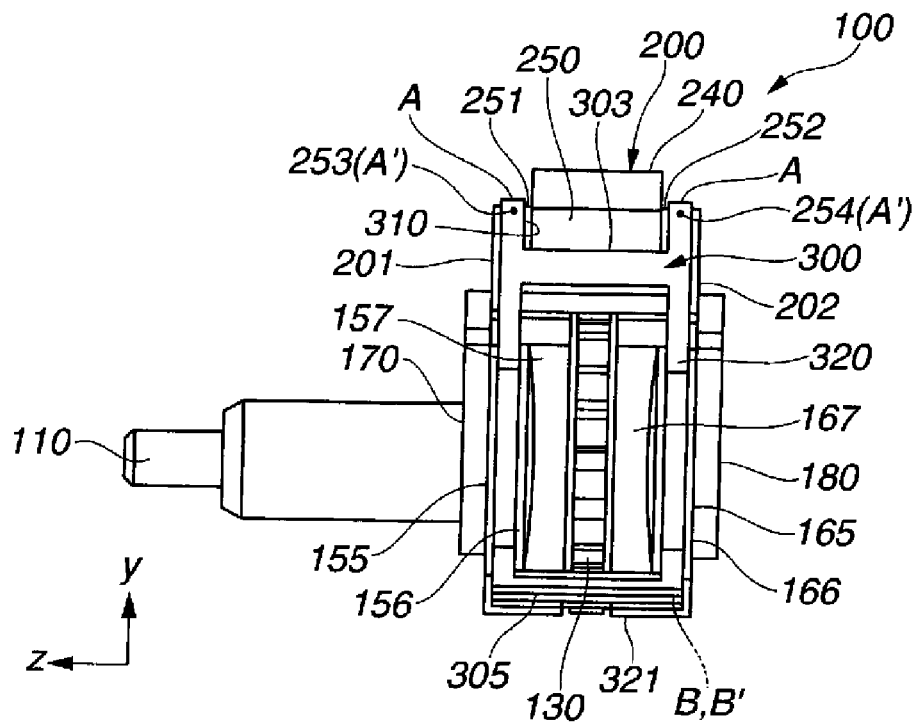
FIG. 6 is a front view of the pump assembly as viewed from x-axis positive side, in the first embodiment.

In the respective drawings, a direction from a driven shaft 120 toward a drive shaft 110 in a pump assembly 100 is defined as x-axis positive direction. Moreover, a direction perpendicular to x-axis and toward a seal block 200 of the pump assembly 100 is defined as y-axis positive direction. Moreover, a direction that is coaxially with the drive shaft 110 and is from the pump assembly 100 toward a motor (not shown) is defined as z-axis positive direction. FIG. 4 is an oblique perspective view of the pump assembly 100. FIG. 5 is a front view of the pump assembly 100 as viewed from y-axis positive side. FIG. 6 is a front view of the pump assembly 100 as viewed from x-axis positive side.

[Housing]

The housing 10 is formed with a drive-shaft supporting hole 11 and a cylinder hole 12. The pump assembly 100 is housed or disposed in the cylinder hole 12 formed in a cylindrical shape. The drive shaft 110 is rotatably supported by the drive-shaft supporting hole 11 through a bush.

An inner circumferential surface of the cylinder hole 12 includes a contact surface 12a serving for a positioning, and a inner wall 12b. The contact surface 12a is formed with a higher degree of accuracy than the inner wall 12b, in order to perform the positioning of pump assembly 100 by abutting on the seal block 200. Moreover, the housing 10 is formed with a discharge port 13 in an x-axis positive side of the housing 10. The discharge port 13 communicates the cylinder hole 12 with an external.

The housing cover 20 is attached to a z-axis negative side of the housing 10. The pump assembly 100 is housed or enclosed fluid-tightly by the cylinder hole 12 and the housing cover 20. The housing cover 20 is formed with a suction port 21 in an axial direction of the housing cover 20. The suction port 21 is a z-axis directional through-hole for supplying working oil to the pump assembly 100.

[Details of Pump Assembly]

The pump assembly 100 includes the seal block 200, the drive shaft 110, the driven shaft 120, a drive-side gear 130, a driven-side gear 140, and a first side plate 150 and a second side plate 160 (a pair of side boards). This pump assembly 100 is temporarily tightened (clamped) by a leaf spring 300 formed in a mound shape. An x-axis directional width of the seal block 200 is smaller than those of the first side plate 150 and the second side plate 160.

Each of the first side plate 150, the second side plate 160 and the seal block 200 is formed symmetrically with respect to a straight line II-II which is a center line between the drive shaft 110 and the driven shaft 120 on a radial plane (on x-y plane). Also, the leaf spring 300 is formed symmetrically with respect to the line II-II, and has a biasing force symmetrical with respect to the line II-II. Since the line II-II is the center line between the drive shaft 110 and the driven shaft 120, the line II-II is in parallel with y-axis.

Moreover, the pump assembly 100 is partly in contact with the leaf spring 300 on x-y plane. In detail, the pump assembly 100 is in contact with the leaf spring 300 at three points A, B and C on x-y plane. This contact point A is located on a y-axis positive side of the seal block 200. The contact points B and C are located on x-axis directional both end portions 152 of a y-axis negative side surface 151 of the first side plate 150, and located on x-axis directional both end portions 162 of a y-axis negative side surface 161 of the second side plate 160.

The contact point A is located on the line II-II. The line II-II passes in parallel with y-axis, through a center point M between a shaft center (coaxial core) Op of the drive shaft 110 and a shaft center Os of the driven shaft 120. As shown in FIG. 1, a line III-III passes through the shaft center Op and the shaft center Os from x-axis negative side. The points B and C are located on more negative side than the line III-III in the y-axis direction.

Hereinafter, in the case that "point contact" is mentioned in the following explanations of this application, this "point contact" is on the assumption of x-y plane. With x-y-z dimensional space taken into consideration, this "point contact" on x-y plane means "line contact" existing on a z-axis directional line in x-y-z space. That is, from a viewpoint of x-y-z space; the leaf spring 300 is in line-contact with the seal block 200, along a straight line passing through the contact point A in parallel with z-axis. Similarly, the leaf spring 300 is in line-contact with the first side plate 150 and the second side plate 160 along straight lines each passing through the contact point B or C in parallel with z-axis.

Therefore, the pump assembly 100 is biased (urged) in y-axis positive direction at the points B and C, and the pump assembly 100 is caught at the point A of a y-axis positive side of the pump assembly 100 by the leaf spring 300. By means of these supports of the contact points A, B and C, the leaf spring 300 presses the seal block 200 from y-axis positive side to the first side plate 150 and the second side plate 160 so that the pump assembly 100 is provisionally tightened.

Since the width of the seal block 200 in the x-axis direction is smaller than those of the first side plate 150 and the second side plate 160 as mentioned above; the y-axis positive side of the seal block 200 is supported at the point A by means of one point-support (on x-y plane), and the y-axis negative side of each of the first side plate 150 and the second side plate 160 is supported at the points B and C by means of two-point support (on x-y plane). Hence, the seal block 200 is stably biased in the y-axis negative direction.

(Drive Shaft and Driven Shaft)

The drive shaft 110 is provided to be able to rotate integrally with the drive-side gear 130. The driven shaft 120 is provided to be able to rotate integrally with the driven-side gear 140. The drive shaft 110 is connected with the motor (not shown) at a z-axis positive end portion of the drive shaft 110. The drive-side and driven-side gears 130 and 140 are spur gears adapted to engage with each other. By this engagement between the drive-side and driven-side gears 130 and 140, the driven shaft 120 rotates according to the rotation of drive shaft 110. Although only the driven-side gear 140 is shown in FIG. 2, the drive-side gear 130 is also in the same shape as the driven-side gear 140.

(Side Plate)

Each of the first side plate 150 and second side plate 160 is formed substantially in a figure-of-eight. The first side plate 150 is formed in the same shape as the second side plate 160. Moreover, the first side plate 150 is formed with a drive-shaft passing hole 153 and a driven-shaft passing hole 154, and the second side plate 160 is formed with a drive-shaft passing hole 163 and a driven-shaft passing hole 164. A y-axis positive-side surface 150a of the first side plate 150 is depressed in y-axis negative direction at an x-axis-directional center portion of the first side plate 150. Thereby, a concave portion 150b is formed in the first side plate 150. Similarly, a y-axis positive-side surface 160a of the second side plate 160 is depressed in y-axis negative direction, at an x-axis-directional center portion of the second side plate 160. Thereby, a concave portion 160b is formed in the second side plate 160.

These concave portions 150b and 160b are communicated with the suction port 21 of the housing cover 20, to enable the supply of working oil. An x-axis positive-side curved surface of the concave portion 150b functions as a drive-side seal surface 158a, and an x-axis positive-side curved surface of the concave portion 160b functions as a drive-side seal surface 168a. Similarly, an x-axis negative-side curved surface of the concave portion 150b functions as a driven-side seal surface 158b, and an x-axis negative-side curved surface of the concave portion 160b functions as a driven-side seal surface 168b. These drive-side seal surface 158a, drive-side seal surface 168a, driven-side seal surface 158b and driven-side seal surface 168b are sealed with seal block 200.

When assembling (constructing) the pump assembly 100, the drive-side and driven-side gears 130 and 140 are held so as to be sandwiched between the first side plate 150 placed on a z-axis positive side thereof and the second side plate 160 placed on a z-axis negative side thereof. Then, the drive shaft 110 is passed through the drive-shaft passing hole 153 and drive-shaft passing hole 163, and the driven shaft 120 is passed through the driven-shaft passing hole 154 and driven-shaft passing hole 164. Under the constructed state of pump assembly 100, tooth tips 131 and 141 of the respective gears 130 and 140 are located radially outward beyond the drive-side seal surfaces 158a and 168a and the driven-side seal surfaces 158b and 168b (i.e., are located to project in the radial direction from the drive-side seal surfaces 158a and 168a and the driven-side seal surfaces 158b and 168b).

A first seal ring 170 is provided on a z-axis positive-side surface 155 of the first side plate 150, and a second seal ring 180 is provided on a z-axis negative-side surface 165 of the second side plate 160. The respective first seal ring 170 and second seal ring 180 surround the drive shaft 110 and the driven shaft 120. The first seal ring 170 is in contact with the housing 10, and the second seal ring 180 is in contact with the housing cover 20.

Accordingly, sliding surfaces between the drive and driven shafts 110 and 120 and the first and second side plates 150 and 160 are located (radially) inside the respective seal rings 170 and 180, to form a suction region Din (first fluid chamber). The suction region Din is fluid-tightly sealed (separated) from the outside of respective seal rings 170 and 180, namely, sealed from a discharge region Dout (second fluid chamber).

A first backup ring 190a is provided on an inner circumferential side of the first seal ring 170, and a second backup ring 190b is provided on an inner circumferential side of the second seal ring 180. These first and second backup rings 190a and 190b are formed of a material having a higher hardness than the seal rings 170 and 180. The first and second backup rings 190a and 190b function as a holding member for preventing an excessive deformation of the seal rings 170 and 180 which is caused due to a discharge pressure.

The first side plate 150 is formed with a first step portion 156, and the second side plate 160 is formed with a second step portion 166. The first step portion 156 is formed by cutting x-axis-directional both end portions of the z-axis positive-side surface 155 of the first side plate 150. Similarly, the second step portion 166 is formed by cutting x-axis-directional both end portions of the z-axis negative-side surface 165 of the second side plate 160.

Since there are provided the first step portion 156 and second step portion 166; x-axis directional both side surfaces 157 of the first side plate 150 are cut out inwardly in the x-axis direction, and x-axis directional both side surfaces 167 of the second side plate 160 are cut out inwardly in the x-axis direction. Hence, as viewed on the x-y plane; the first step portion 156 has a curvature different from that of the y-axis negative side surface 151 (and the x-axis directional both side surfaces 157) of the first side plate 150, and the second step portion 166 has a curvature different from that of the y-axis negative side surface 161 (and the x-axis directional both side surfaces 167) of the second side plate 160.

Moreover, a z-axis-directional width of each of the first and second step portions 156 and 166 is wider than z-axis-directional widths of first and second metal plates 301 and 302 which constitute the leaf spring 300.

As mentioned above, the first step portion 156 and second step portion 166 are curved at the curvature different from those of the y-axis negative side surfaces 151 and 161 of the first and second side plates 150 and 160, and moreover, each of the first step portion 156 and second step portion 166 is designed to have its z-axis-directional width which is wider than those of the first and second metal plates 301 and 302. Accordingly, under the state where the leaf spring 300 has been mounted, the leaf spring 300 is not in contact with the first step portion 156 and second step portion 166.

Therefore, the leaf spring 300 abuts on the first and second side plates 150 and 160, only at the points B and C which are inner points of both end portions 321 and 322 of the leaf spring 300. Thereby, the pump assembly 100 is supported by means of three-point support, namely, at these points B and C and also at the point A at which the seal block 200 is locked. Since the x-axis directional both side surfaces 157 and the x-axis directional both side surfaces 167 are cut inwardly in the x-axis direction to provide the first step portion 156 and second step portion 166 as mentioned above, the first step portion 156 and second step portion 166 are prevented from interfering with leg portions 320 of the leaf spring 300 so that the three-point support is ensured.

The shapes of the first and second side plates 150 and 160 according to the present invention are not limited to the above mentioned shapes. Each of the first and second side plates 150 and 160 may be designed in any shape which can cause the biasing forces of the both end portions 321 and 322 to reliably apply in the y-axis positive direction and also which can prevent the leg portions 320 from interfering with the x-axis directional both side surfaces 157 and 167. That is, each of the first and second side plates 150 and 160 may be designed in any shape which can become in point-contact with the leaf spring 300 (as viewed on x-y plane) and can obtain the y-axis-positive directional biasing force.

(Seal Block)

The position of the seal block 200 is determined by causing the seal block 200 to abut on the contact surface 12a of inner circumferential surface of the housing 10 in the y-axis positive direction. The seal block 200 serves to conduct a sealing by abutting on the first and second side plates 150 and 160 at a y-axis negative side of the seal block 200. The y-axis negative side of the seal block 200 is formed with a drive-side seal surface 210 and a driven-side seal surface 220. The drive-side and driven-side seal surfaces 210 and 220 are formed in a circular-arc shape having the same curvature as those of the drive-side seal surfaces 158a and 168a and the driven-side seal surfaces 158b and 168b of the side plates 150 and 160. The drive-side and driven-side seal surfaces 210 and 220 are fluid-tightly in contact with the drive-side seal surfaces 158a and 168a and the driven-side seal surfaces 158b and 168b.

As mentioned above, when driving the pump, the tooth tips 131 and 141 of the drive-side and driven-side gears 130 and 140 are located radially outward beyond the drive-side seal surfaces 158a and 168a and the driven-side seal surfaces 158b and 168b of the side plates 150 and 160. Accordingly, the drive-side and driven-side seal surfaces 210 and 220 are cut along the tooth tips 131 and 141 of the respective gears 130 and 140, so as to form tooth contact surfaces 211 and 221. The tooth contact surfaces 211 and 221 are adapted to be in contact with the tooth tips 131 and 141. Hence, the tooth tips 131 and 141 are prevented from abutting on the seal surfaces 210 and 220, and a clearance between the seal surfaces 210 and 220 and the seal surfaces 158a, 168a, 158b and 168b is made substantially equal to 0 so that a sealing performance is secured.

In a region between the tooth contact surfaces 211 and 221, a concave portion 230 may be provided to pass through the seal block 200 in the z-axis direction (i.e., concave portion 230 has the same width as that of the seal block 200 in the z-axis direction). This concave portion 230 is formed by depressing the seal block 200 in the y-axis positive direction. This concave portion 230 cooperates with the concave portions 150b and 160b of the first and second side plates 150 and 160 to define (function as) the suction region Din for introducing working fluid from the suction port 21 to a meshing portion between the drive-side and driven-side gears 130 and 140.

Figure 10:
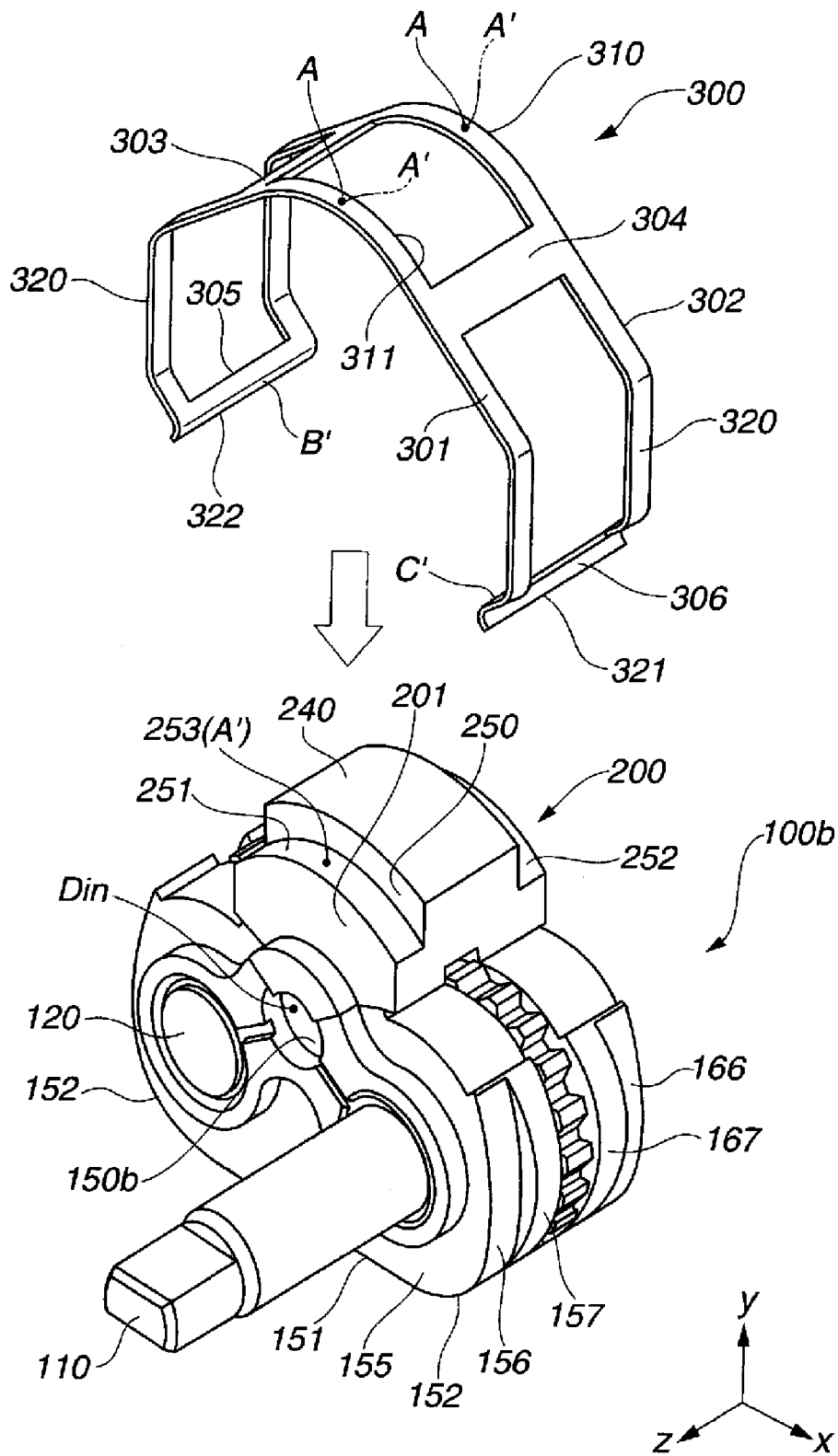
FIG. 10 is a view showing a third process in the assembling of the gear pump in the first embodiment.

On the other hand, a y-axis positive side surface 240 of the seal block 200 is formed in a circular-arc shape in cross section of x-y plane. There is provided a third step portion 251 at a z-axis positive end surface 201 of the seal block 200, and there is provided a fourth step portion 252 at a z-axis negative end surface 202 of the seal block 200. That is, each of the third and fourth step portions 251 and 252 is formed to cut a y-axis positive side portion of the seal block 200 at both end surfaces 201 and 202, to have a y-axis negative directional depth. Each (of surfaces) of the third and fourth step portions 251 and 252 is formed in a convex shape protruding in the y-axis positive direction as shown in FIG. 10, and has a y-axis positive end portion 253, 254 located on the above-mentioned line II-II. These y-axis positive end portions 253 and 254 are identical with the contact point A abutting on the leaf spring 300.

Because of the existence of the third step portion 251 and fourth step portion 252, the seal block 200 includes a protruding portion 250 protruding in the y-axis positive direction. That is, each of the first and second metal plates 301 and 302 of the leaf spring 300 is in contact with the seal block 200 at the contact point A. Thereby, the leaf spring 300 is fitted over the protruding portion 250 of the seal block 200 so that the position of the leaf spring 300 is determined. At this time, the leaf spring 300 locks the seal block 200 in the y-axis positive direction by abutting on (the points A of) third and fourth step portions 251 and 252.

As shown in FIGS. 2 and 3, a distance between z-axis positive-side surface 155 of the first side plate 150 and the z-axis negative-side surface 165 of the second side plate 160 is equal to the z-axis directional width of the seal block 200. Accordingly, the first and second seal rings 170 and 180 respectively provided to the respective side plates 150 and 160 are also in contact with the z-axis both end surfaces of the seal block 200. Thereby, the drive-side seal surfaces 158a and 168a and the driven-side seal surfaces 158b and 168b of the side plates 150 and 160, and the seal surfaces 210 and 220 of the seal block 200 are sealed also at the z-axis both end surfaces thereof by the respective seal rings 170 and 180.

(Pressing Force of Seal Block by Fluid-Pressure Difference)

At the time of drive of the pump, working fluid is sucked from a z-axis negative side of a suction passage D by the drive of the drive-side and driven-side gears 130 and 140 and then is discharged from a z-axis positive side of suction passage D. Accordingly, the outer circumferential side of the seal block 200 except the contact surfaces between the seal block 200 and the pump assembly 100 (an after-mentioned first subassembly 100a) is exposed to a discharge side (Dout) of working fluid, and hence receives a relatively high pressure. The contact surfaces of the seal block 200 between the pump assembly 100 and the seal block 200 are exposed to a suction side of working fluid, and hence receive a relatively low pressure. Therefore, a pressure difference is caused in the y-axis negative direction in dependence upon the pump driving.

Because of this pressure difference, the seal block 200 is biased or urged to the pump assembly 100 in the y-axis negative direction. Therefore, the sealing performance is enhanced in the contact surfaces between the seal block 200 and the pump assembly 100.

[Details of Leaf Spring]

Figure 7:
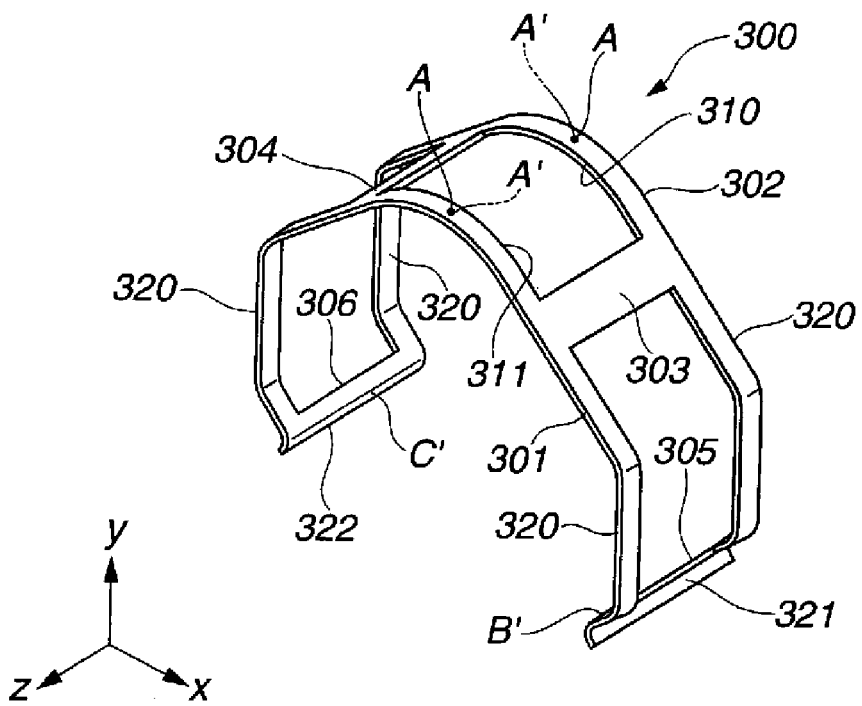
FIG. 7 is an oblique perspective view of a leaf spring, in the first embodiment.

FIG. 7 is an oblique perspective view of the leaf spring 300 itself. The leaf spring 300 serves to temporarily fixing the pump assembly 100. The shape and the elastic force of the leaf spring 300 are symmetrical with respect to a line A'-A' (A' is a center point relative to the x-axis direction). In this embodiment, the usage of the leaf spring 300 avoids an influence of a reduction in elastic force due to time degradation as compared with the usage of a coil spring.

The leaf spring 300 is formed by placing the two mound-shaped metal plates 301 and 302 in parallel with each other, and combining these metal plates 301 and 302 with each other. As shown in FIGS. 4 to 6, the two metal plates 301 and 302 are connected with each other at the both end portions 321 and 322 of the leg portions 320 and at both x-axis-directional adjacent areas of the seal block 200. That is, the two metal plates 301 and 302 are connected with each other by the connecting portions 303 to 306 as shown in FIG. 4 to 7.

The connecting portions 303 and 304 provided in the y-axis positive side cooperate with the metal plates 301 and 302 to define a fitting hole 311. By fitting the protruding portion 250 of the seal block 200 into this fitting hole 311, the positioning at the time of the assembling is made easy (see FIG. 10: third process).

Moreover, the leaf spring 300 is curved in a y-axis-positive directional convex shape by defining the above-mentioned point A' as a center of the curved convex shape. The point A' is located on the straight line II-II, and the leaf spring 300 is deformed symmetrically with respect to the point A' (line A'-A'). A central portion 310 of the leaf spring 300 in the x-axis direction straddles the seal block 200, and the point A' of the leaf spring 300 is in point-contact with the contact point A of the seal block 200 (as viewed on x-y plane). Under the assembled state, the point A meets the point A'.

On the other hand, the leg portions 320 each extending from the central portion 310 in the x-axis positive or negative direction and also in the y-axis negative direction are fitted over the first and second side plates 150 and 160. X-axis directional inner points B' and C' of the both end portions 321 and 322 of the leg portions 320 are in point contact with the contact points B and C of the first and second side plates 150 and 160 (as viewed on x-y plane).

[Assembling Process Flow]

Figure 8:
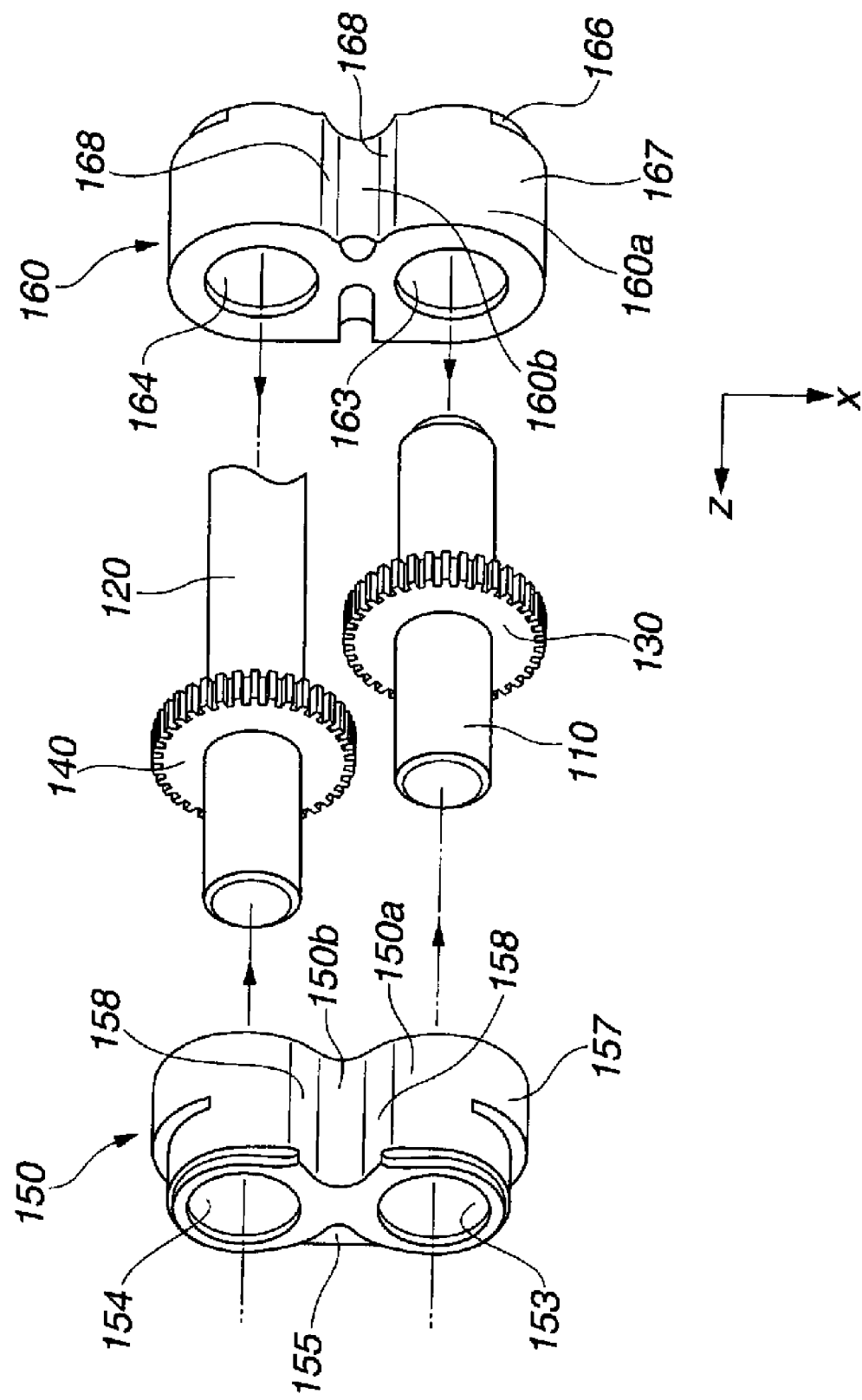
FIG. 8 is a view showing a first process in an assembling of the gear pump in the first embodiment.

(First Process: FIG. 8)

In a first process, the drive shaft 110, the driven shaft 120, and the first and second side plates 150 and 160 are assembled or attached to one another to form the first subassembly 100a.

Figure 9:
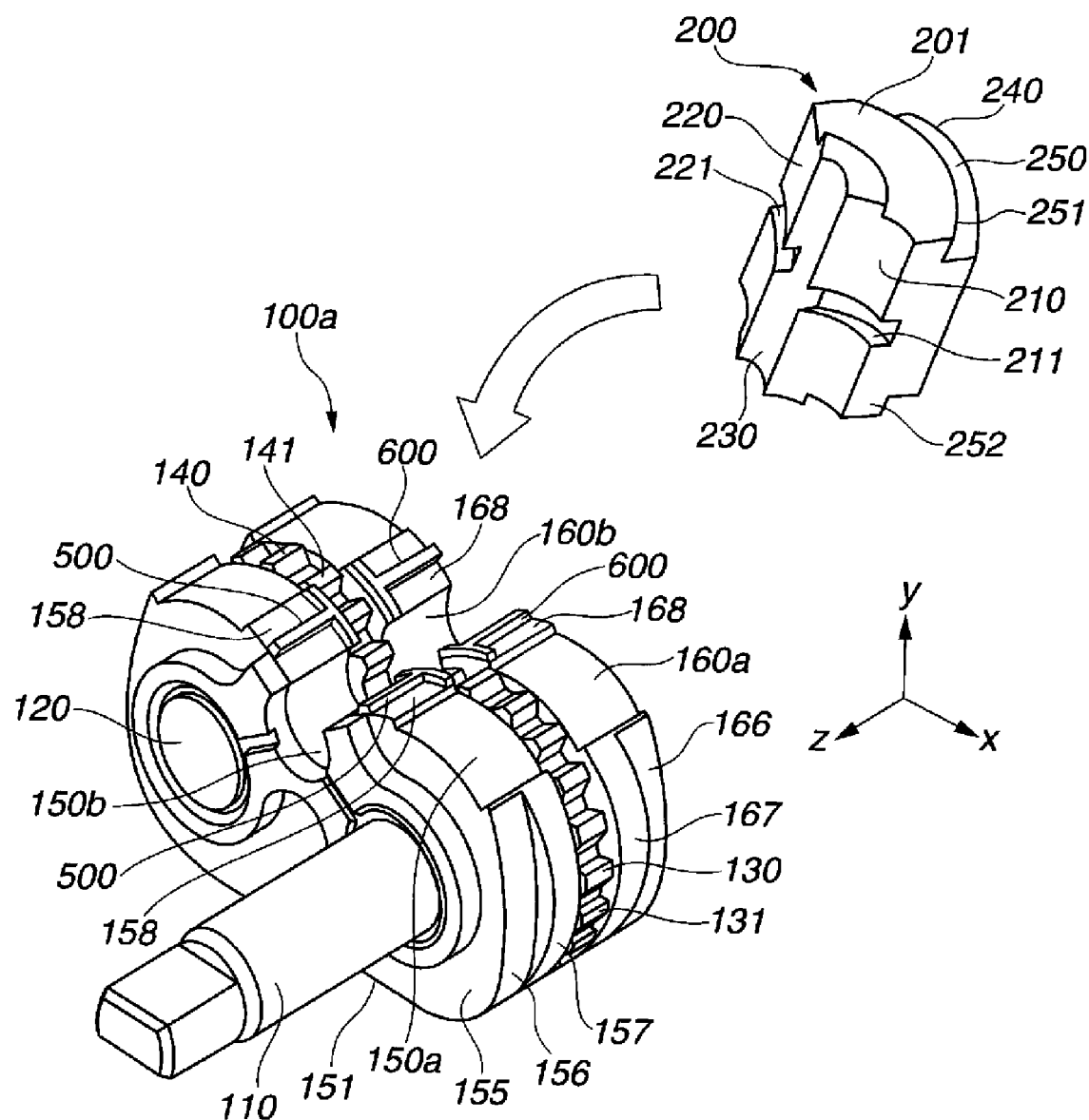
FIG. 9 is a view showing a second process in the assembling of the gear pump in the first embodiment.

(Second Process: FIG. 9)

In a second process, the seal block 200 is attached to the first subassembly 100a to form a second subassembly 100b. When attaching the seal block 200, the seal block 200 is pressed to the drive-side seal surfaces 158a and 168a and the driven-side seal surfaces 158b and 168b of the first and second side plates 150 and 160.

At this time, ribs 500 and 600 provided on the drive-side seal surfaces 158a and 168a and the driven-side seal surfaces 158b and 168b are deformed by plastic deformation. Thus, the ribs 500 and 600 are reliably made to be in contact with the seal surfaces 210 and 220 of the seal block 200 so that the fluid-tight performance is secured. However, the ribs 500 and 600 may be omitted.

(Third Process: FIG. 10)

In a third process, the leaf spring 300 is fitted over the second subassembly 100b from the y-axis positive side, to form the pump assembly 100. That is, the mound-shaped leaf spring 300 is made to straddle the seal block 200, and then the leaf spring 300 is fitted over the first and second side plates 150 and 160, so as to become detachable from the first and second side plates 150 and 160 with the leaf spring 300 kept in contact with the contact point A.

Thereby, the both end portions 321 and 322 of leg portions 320 are in contact with the x-axis directional both end portions 152 and 162 of the first and second side plates 150 and 160. The leaf spring 300 biases the first and second side plates 150 and 160 in the y-axis positive direction by means of elastic force, and receives the y-axis positive side of the seal block 200 at the contact point A. Thus, the pump assembly 100 is provisionally tightened.

The respective step portions 251 and 252 of the seal block 200 are provided in the z-axis both directional surfaces of the seal block 200. Similarly, the first step portion 156 of the first side plate 150 is provided in the z-axis positive-side surface 155 of the first side plate 150, and the second step portion 166 of the second side plate 160 is provided in the z-axis negative-side surface 165 of the second side plate 160.

It is favorable that each of the seal block 200 and the first and second side plates 150 and 160 is formed by means of a sintering of low price. At the time of the sinter forming, sintering dies are fitted with each other in the z-axis direction of each of the seal block 200 and the first and second side plates 150 and 160. Therefore in this embodiment, the sintering dies are provided to have shapes of the respective step portions 251, 252, 156 and 166. Thereby, when forming the seal block 200 and the first and second side plates 150 and 160 by means of sinter forming, the respective step portions 251, 252, 156 and 166 are formed concurrently. Accordingly, process man-hours are reduced while using the low-cost sinter forming. This results in a cost reduction. It is noted that dummy tools for the assembling may be used in the first and second processes, instead of the drive and driven shafts 110 and 120 and the respective gears 130 and 140.

[Seal Ring and Backup Member]

Figure 11:
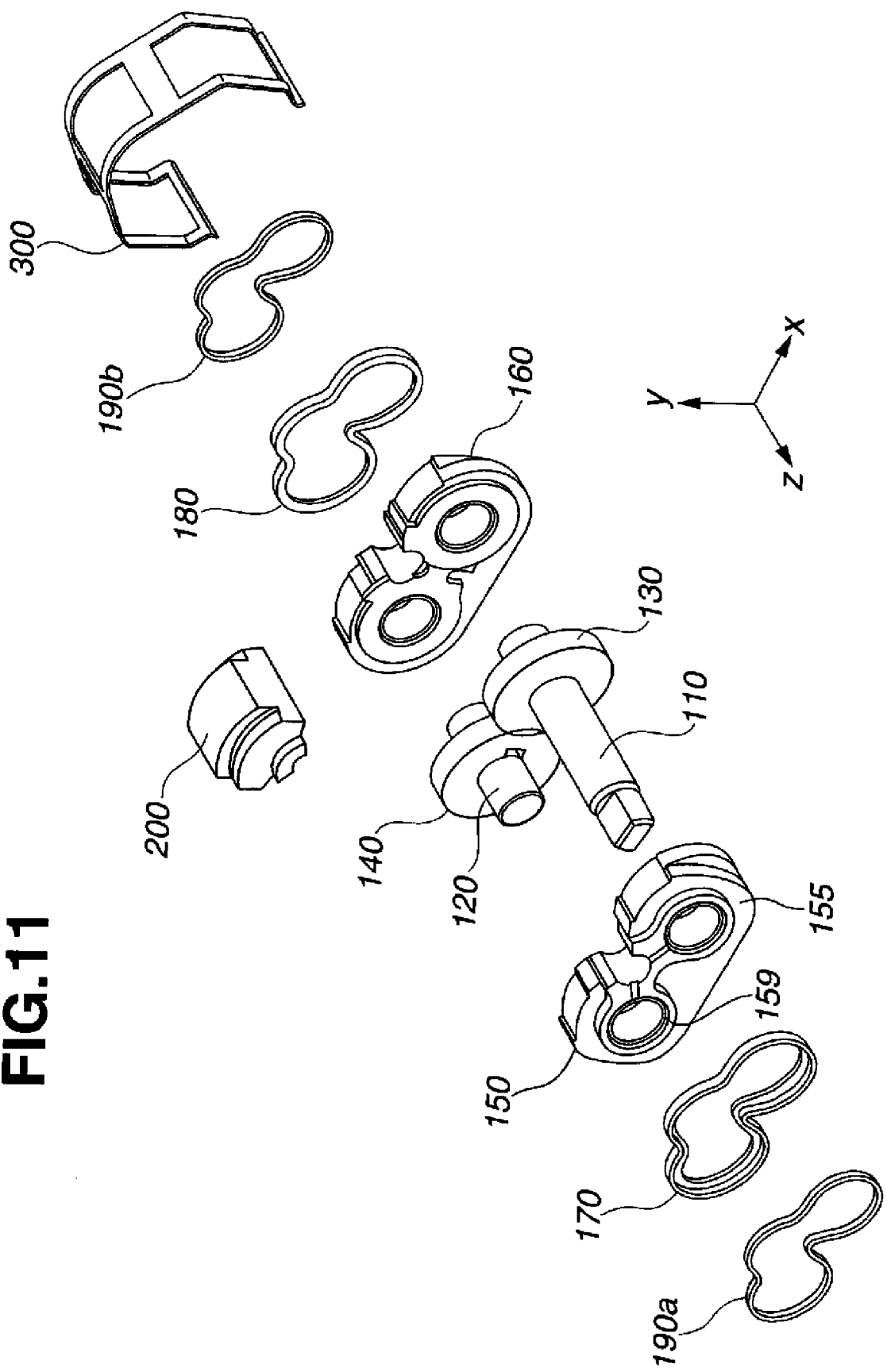
FIG. 11 is an exploded perspective view of the pump assembly.
Figure 12:
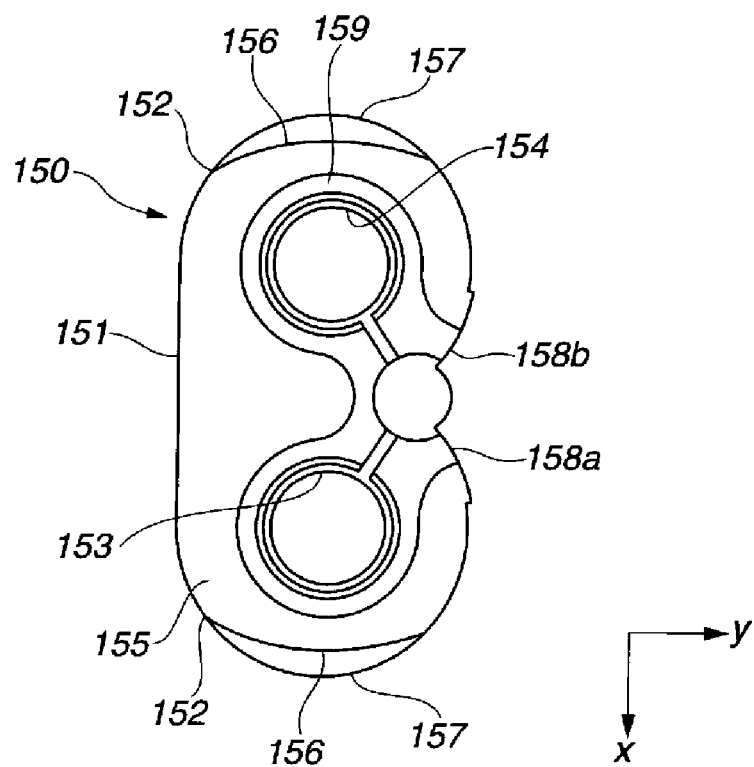
FIG. 12 is a front view of a first side plate from the z-axis positive side.
Figure 13:
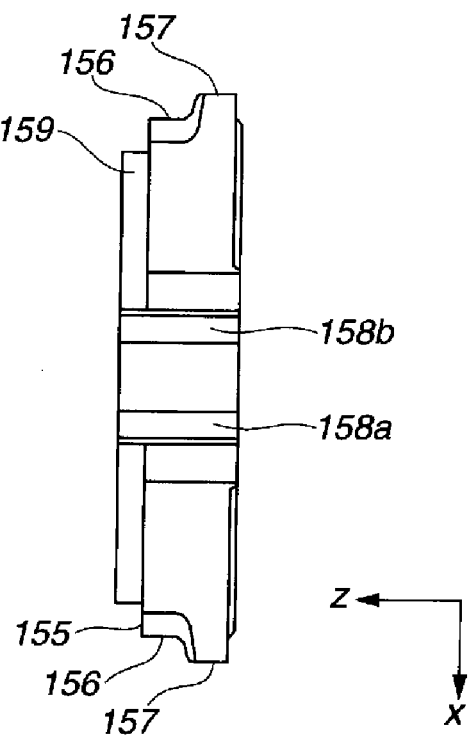
FIG. 13 is a front view of the first side plate from the y-axis positive side.
Figure 14:
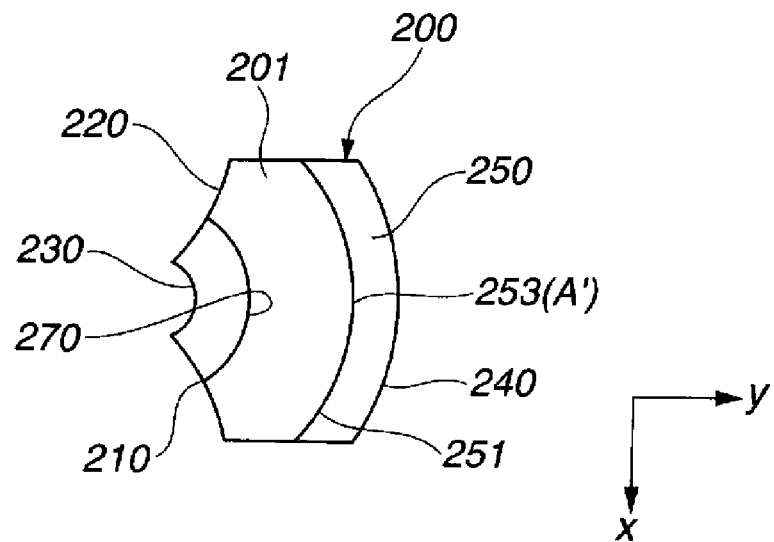
FIG. 14 is a front view of a seal block from the z-axis positive side.
Figure 15:
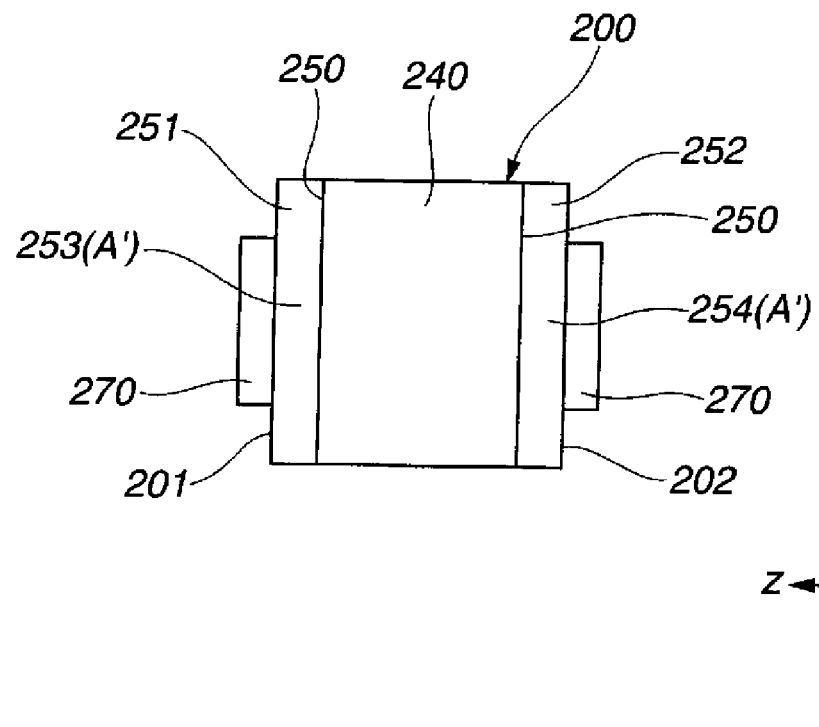
FIG. 15 is a front view of the seal block from the y-axis positive side.
Figure 16:
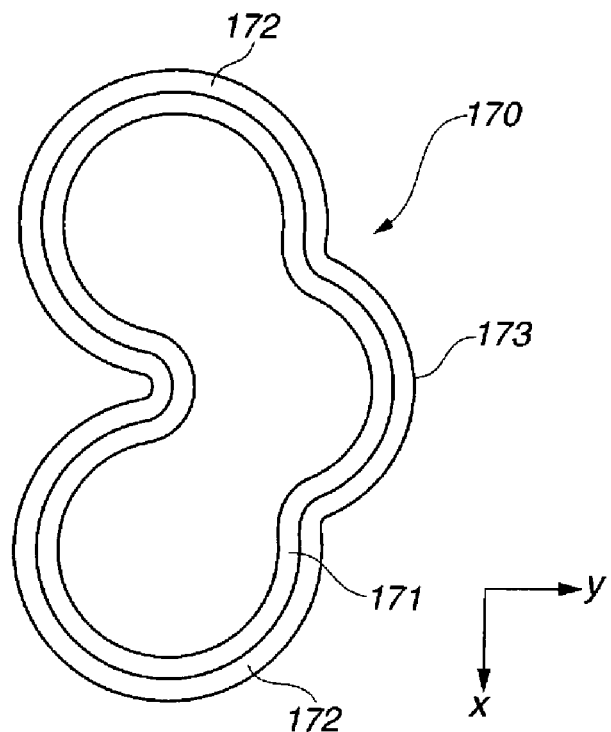
FIG. 16 is a front view of a first seal ring from the z-axis positive side.
Figure 17:
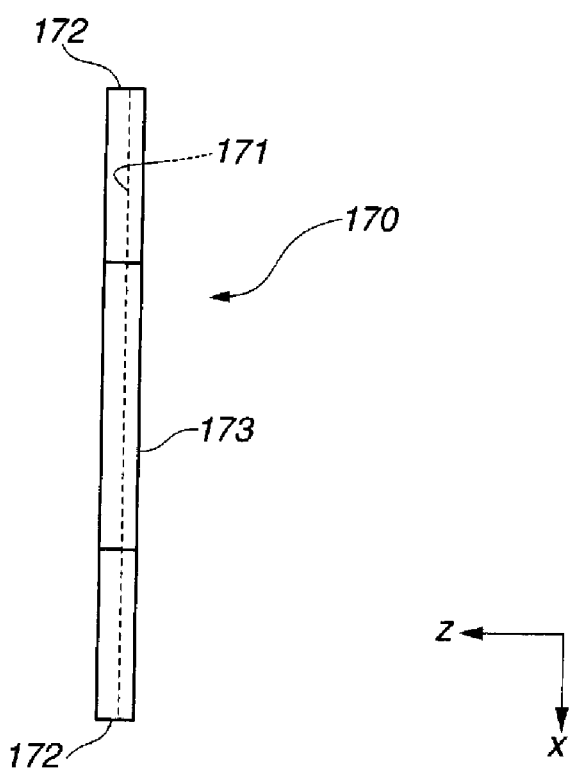
FIG. 17 is a front view of the first seal ring from the y-axis positive side.
Figure 18:
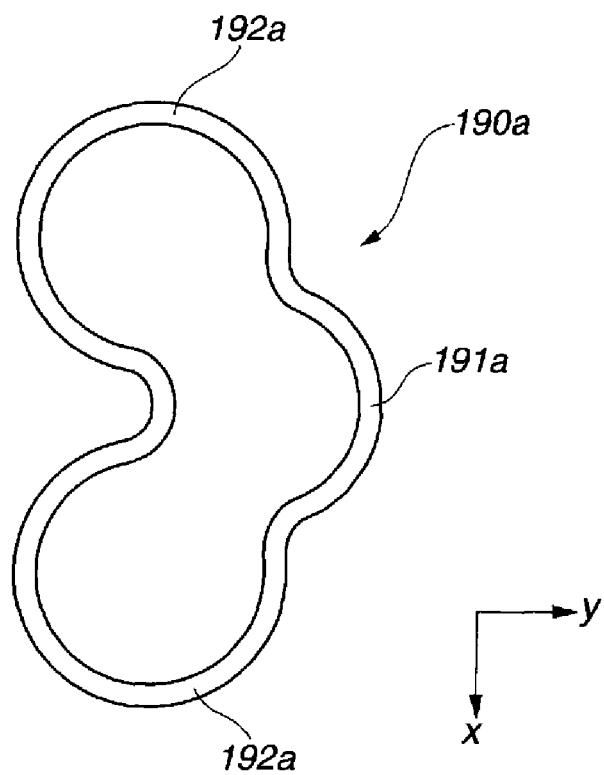
FIG. 18 is a front view of a first backup ring from the z-axis positive side.
Figure 19:
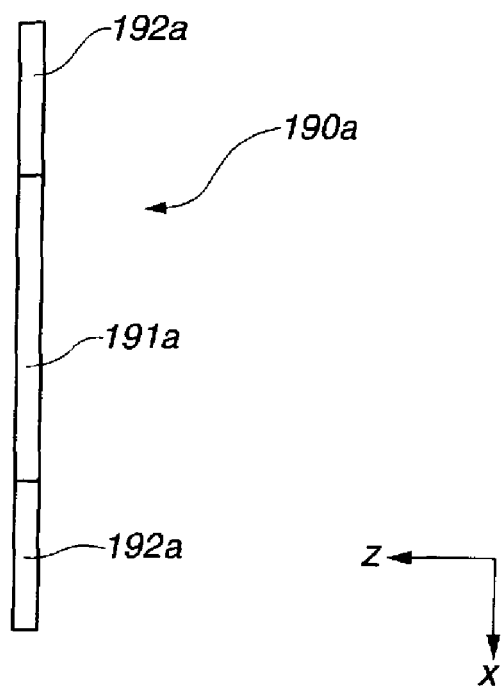
FIG. 19 is a front view of the first backup ring from the y-axis positive side.

FIG. 11 is an exploded perspective view of the pump assembly 100. FIG. 12 is a front view of the first side plate 150 from the z-axis positive side. FIG. 13 is a front view of the first side plate 150 from the y-axis positive side. FIGS. 14 and 15 are front views of the seal block 200 from the z-axis positive side and from the y-axis positive side. FIGS. 16 and 17 are front views of the first seal ring 170 from the z-axis positive side and from the y-axis positive side. FIGS. 18 and 19 are front views of the first backup ring 190a from the z-axis positive side and from the y-axis positive side.

Since the respective seal rings 170 and 180 are symmetrical to each other and also the respective backup rings 190a and 190b are symmetrical to each other; only the first seal ring 170 and the first backup ring 190a are shown in FIGS. 12 to 19.

Each of the first and second seal rings 170 and 180 is engaged with a shoulder portion 159 or 169 of the first or second side plate 150 or 160. This shoulder portion 159 or 169 is provided around the drive-shaft passing hole 153 or 163 and the driven-shaft passing hole 154 or 164. The shoulder portion 159 is a step portion protruding in the z-axis positive direction from the z-axis positive-side surface 155 of the first side plate 150, and similarly, the shoulder portion 169 is a step portion protruding in the z-axis negative direction from the z-axis negative-side surface 165 of the second side plate 160.

Each of the first and second seal rings 170 and 180 is also engaged with a shoulder portion 270 of the seal block 200. The shoulder portions 270 are step portions protruding respectively in the z-axis positive direction from the z-axis positive end surface 201 of the seal block 200 and in the z-axis negative direction from z-axis negative end surface 202 of the seal block 200.

Accordingly, the first and second seal rings 170 and 180 fluid-tightly seals the suction region Din (first fluid chamber: low pressure area) formed between the seal block 200 and the first and second side plates 150 and 160. Hereinafter, for the purpose of simplification of the disclosure, only the first side plate 150, the first seal ring 170 and the first backup ring 190a are explained or shown. Hence, the first seal ring 170 and the first backup ring 190a will be simply described as "seal ring 170" and "backup ring 190a".

Each of the seal ring 170 and the backup ring 190a includes a convex shape in a y-axis positive side of the seal ring 170 (or the backup ring 190a), and a concave shape in a y-axis negative side of the seal ring 170 (or the backup ring 190a). That is, one side of the seal ring 170 (or the backup ring 190a) is formed to bulge in the y-axis positive direction, and another side of the seal ring 170 (or the backup ring 190a) is formed to be depressed in the y-axis positive direction. A y-axis positive side portion 173 of the seal ring 170 is fitted or engaged with the shoulder portion 270 of the seal block 200. Moreover, x-axis positive and negative portions 172 of the seal ring 170 are fitted or engaged with the shoulder portion 159 of the first side plate 150.

A groove 171 is formed in an inner circumference of the seal ring 170. The groove 171 is provided so as to dent or cut the inner circumferential portion of the seal ring 170 toward the z-axis negative side. An inner diameter of this groove 171 (i.e., a radially contact surface of groove 171 with the backup ring 190a) is provided in the same shape as that of an outer diameter of the backup ring 190a. A y-axis positive side portion 191a of the backup ring 190a is fitted or engaged with the y-axis positive side portion 173 of the seal ring 170, and x-axis positive and negative side portions 192a of the backup ring 190a are fitted or engaged with the x-axis positive and negative portions 172 of the seal ring 170. The seal ring 170 is engaged with the respective shoulder portions 159 and 270 under the state where the backup ring 190a is fitted in the groove 171.

[Disengagement Prevention of Backup Ring]

Figure 20:
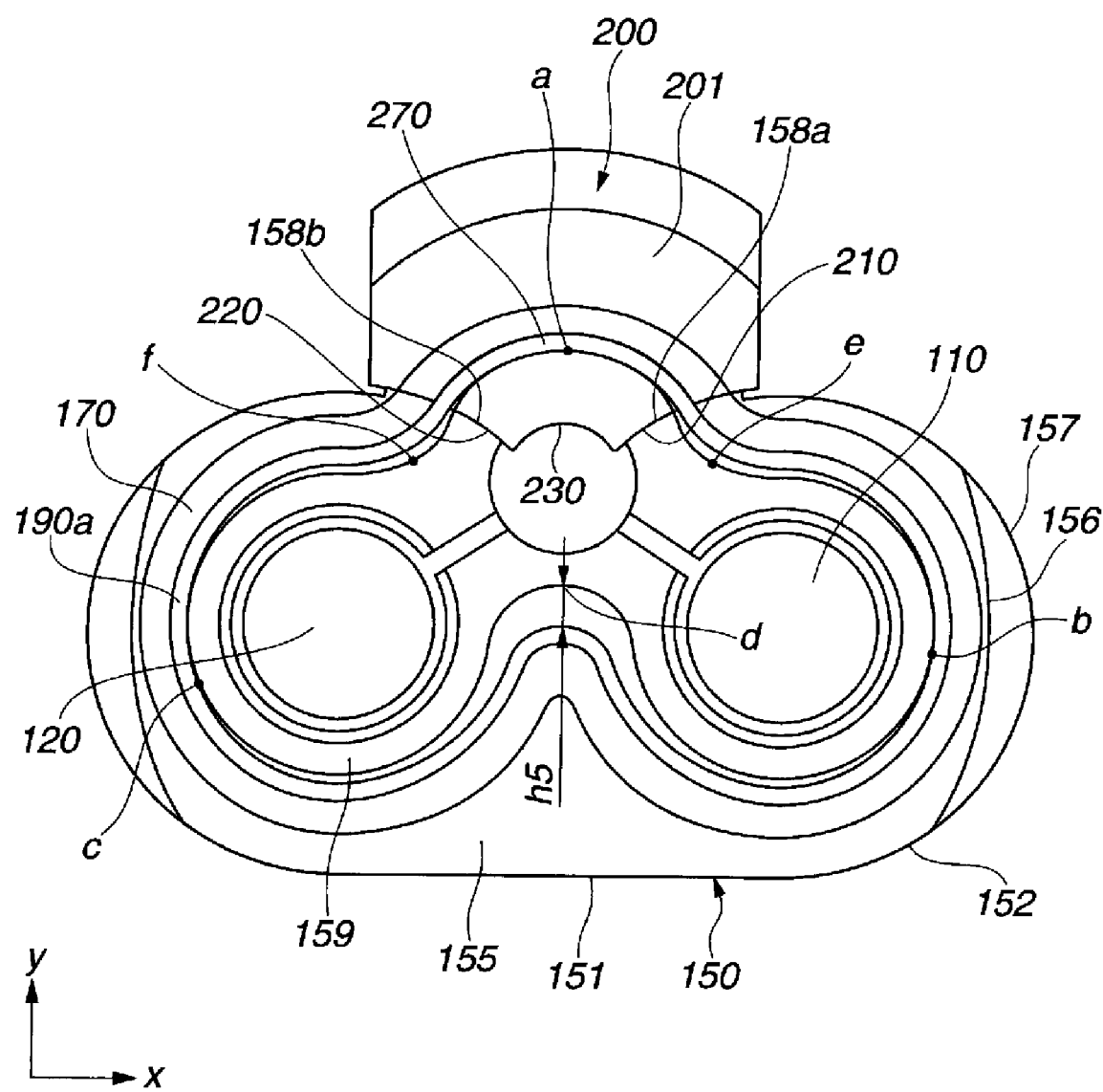
FIG. 20 is a front view of the pump assembly as viewed from z-axis positive side, without showing a housing and a leaf spring.

FIG. 20 is a front view of the pump assembly 100 as viewed from the z-axis positive side, without showing the housing 10 and the leaf spring 300. The backup ring 190a is fitted or engaged with the side-plate shoulder portion 159 and the seal-block shoulder portion 270. However, if this engagement (fitting) is loose, there is a fear that the backup ring 190a is disengaged and detached.

Hence, at points a, b and c in FIG. 20, the respective shoulder portions 159 and 270 are (inscribed) in contact with a radially-inner surface of the backup ring 190a with predetermined tightening widths. On the other hand, at points d, e and f, there are provided spaces. Accordingly, the backup ring 190a and the seal ring 170 are made to reliably engage with the respective shoulder portions 159 and 270 by tightening forces at the points a, b and c. Moreover, by virtue of the presence of the spaces (clearance h5) at points d, e and f, the sealing 170 is prevented from being jammed as explained below.

[Jamming Prevention of Seal Ring]

Figure 21:
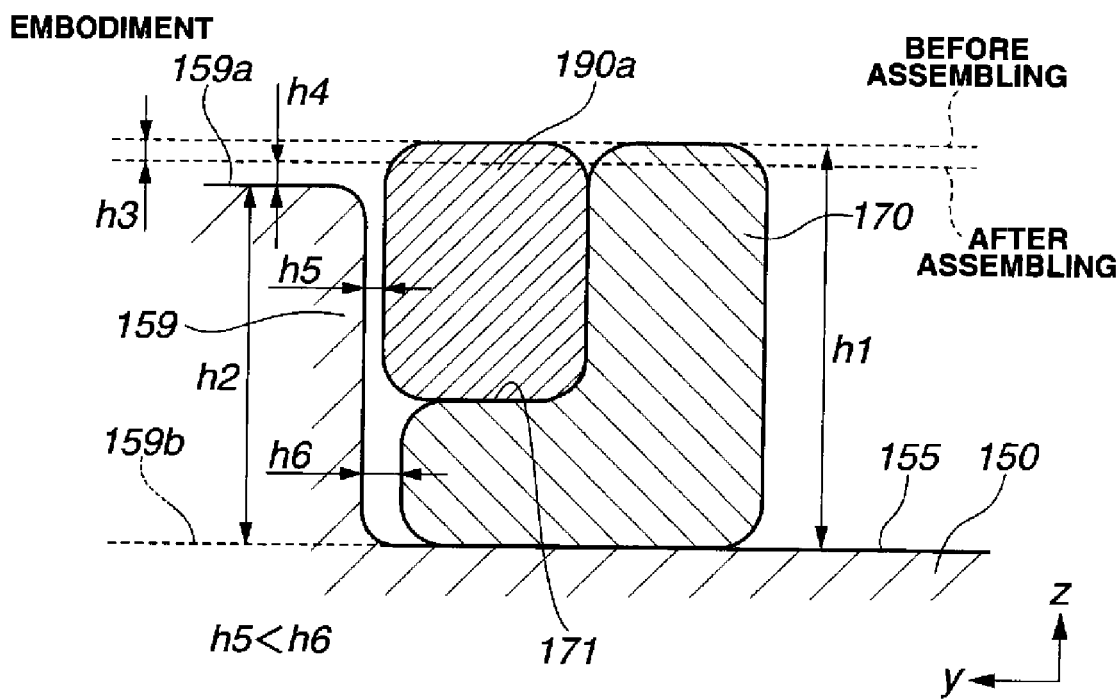
FIG. 21 is a y-z plane cross-sectional view of a part near a point d before the assembling.
Figure 22:
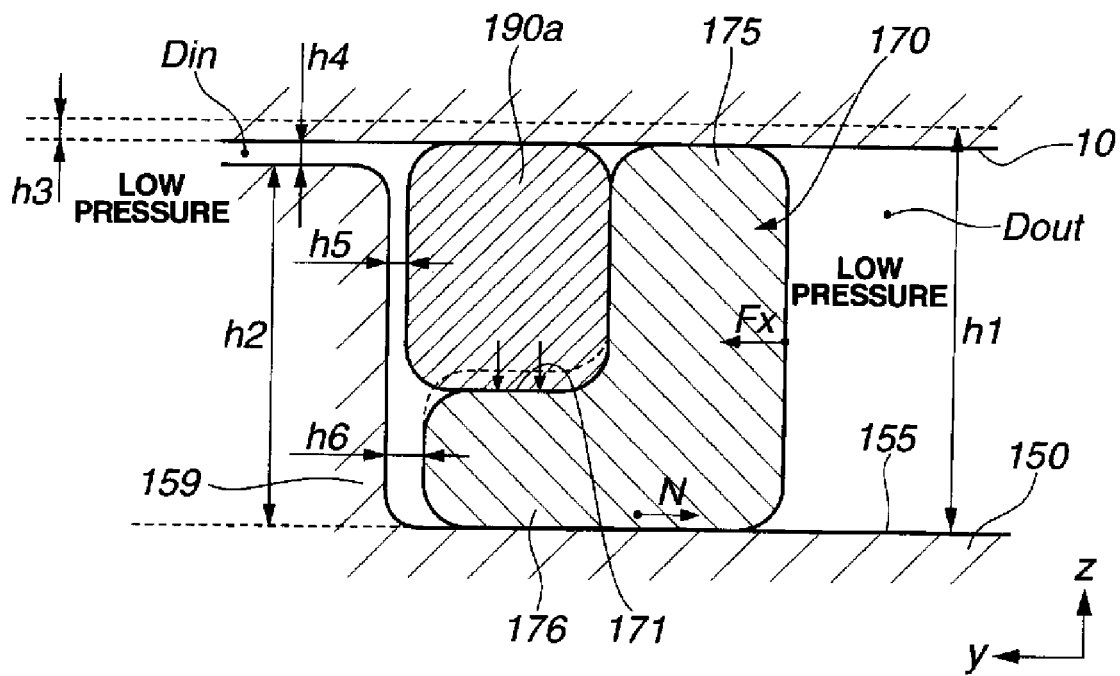
FIG. 22 is a y-z plane cross-sectional view of the part near the point d when a discharge pressure is low.
Figure 23:
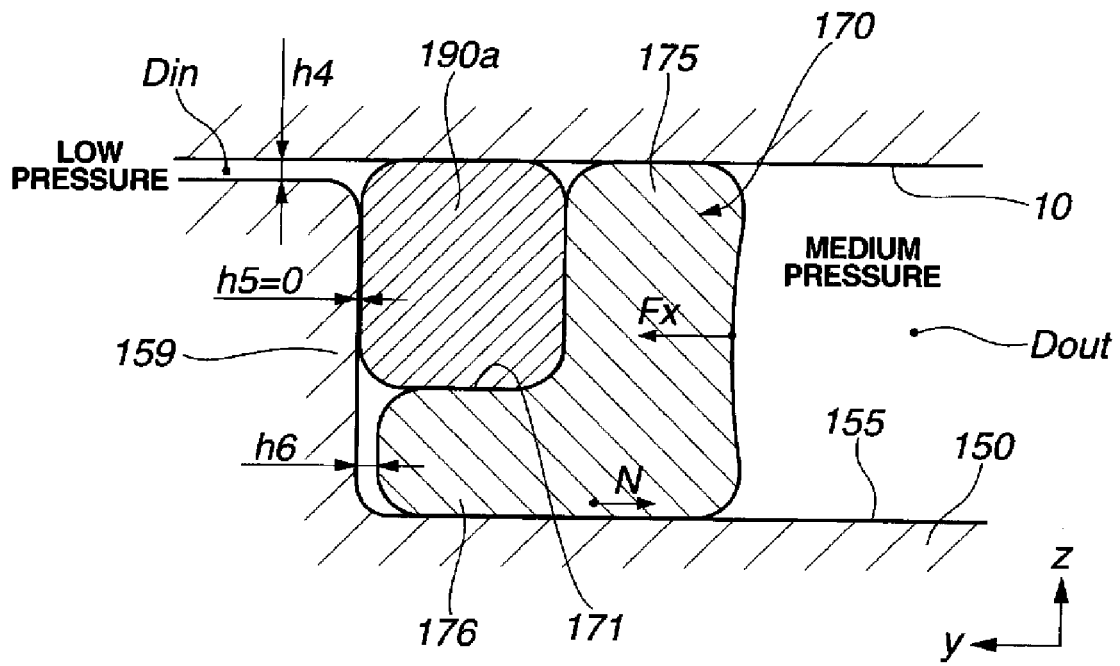
FIG. 23 is a y-z plane cross-sectional view of the part near the point d when the discharge pressure is medium.
Figure 24:
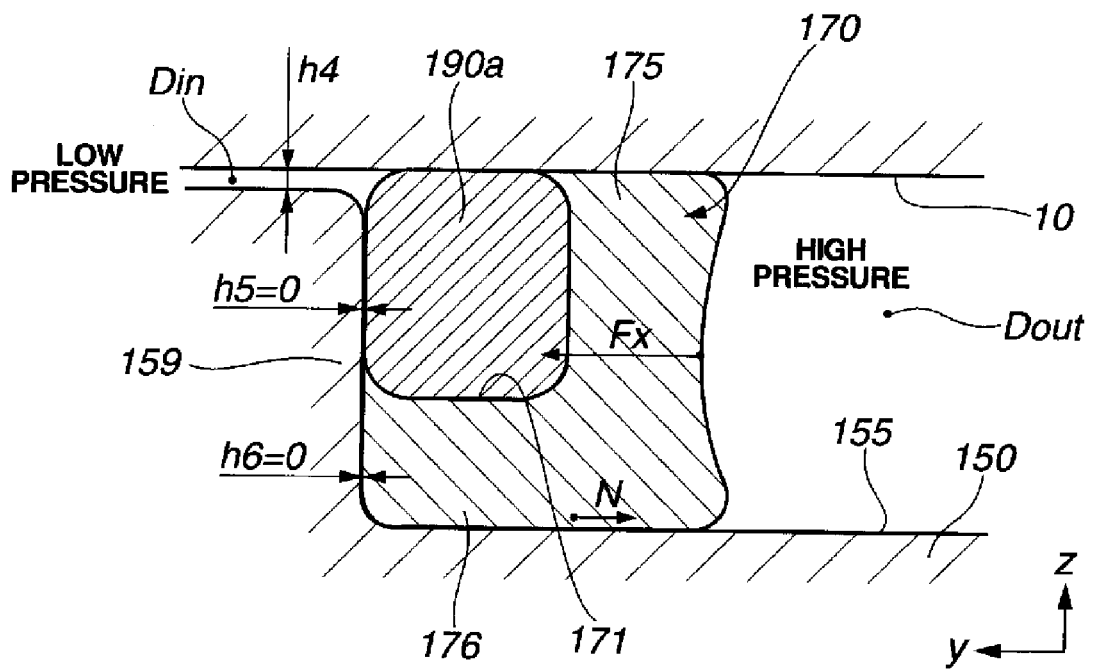
FIG. 24 is a y-z plane cross-sectional view of the part near the point d when the discharge pressure is high.

FIGS. 21 to 24 are y-z plane cross-sectional views of a part near the point d (see FIG. 20) before and after the assembling of the pump assembly 100. FIG. 21 shows a state before the assembling. FIG. 22 shows a state when the discharge pressure is low. FIG. 23 shows a state when the discharge pressure is medium. FIG. 24 shows a state when the discharge pressure is high. It is noted that cross-sectional views of parts near the points e and f are also similar as these FIGS. 21 to 24.

(Before Assembling: FIG. 21)

Before the pump assembly 100 is attached to the housing 10; a z-axis directional width of the seal ring 170 is equal to h1 shown in FIG. 21, and a z-axis directional width of the shoulder portion 159 of the side plate 150 is equal to h2 shown in FIG. 21. That is, a distance between a tip portion 159a of the shoulder portion 159 and a root portion (base) 159b of the shoulder portion 159 is equal to h2. After the pump assembly 100 has been attached to the housing 10, the seal ring 170 is compressed or shrunk in the z-axis direction by a width h3 shown in FIG. 21. That is, the compressed amount is equal to h3. Therefore, after the assembling; the z-axis directional width of the seal ring 170 becomes equal to a value obtained by subtracting h3 from h1 (i.e., h1-h3), and a difference between the z-axis directional width of the shoulder portion 159 and the z-axis directional width of the seal ring 170 becomes equal to h4 shown in FIG. 21. Since a relation h1>h2 is satisfied, a part of the z-axis positive side of the seal ring 170 and the backup ring 190a protrudes from the shoulder portion 159. This protruding amount (width) is equal to h1−h2=h3+h4 (before the assembling) as shown in FIG. 21.

Before operating the pump P; the clearance between the shoulder portion 159 and the backup ring 190a in the y-axis direction is equal to h5, and a clearance between (the root portion 159b of) the shoulder portion 159 and the seal ring 170 in the y-axis direction is equal to h6, so that neither the backup ring 190a nor the seal ring 170 abuts on the shoulder portion 159. Since a relation h5<h6 is satisfied, when approaching the shoulder portion 159, the backup ring 190a becomes in contact with the shoulder portion 159 earlier than the seal ring 170 as shown in FIG. 23. By providing the clearance h6, the clearance h6 functions as a receiving portion (space) for containing or receiving a part of the seal ring 170 at the time of an after-mentioned elastic deformation of the seal ring 170.

(When Discharge Pressure is Low: FIG. 22)

Because of the mounting of the pump assembly 100 to the housing 10, the seal ring 170 is held and pressed to be sandwiched between the side plate 150 and the housing 10. Thereby, the z-axis directional height of the seal ring 170 is reduced by the compressed amount h3. The height difference h4 between the shoulder portion 159 and the seal ring 170 is maintained as a clearance between the housing 10 and the shoulder portion 159 in the z-axis direction.

When a force applied from the discharge region Dout to the seal ring 170 is denoted by Fx, and a resultant of contact friction forces between the rings 170 and 190a and the housing 10 and side plate 150 is denoted by N; a relation Fx<N is satisfied under the state where the discharge pressure is low. Therefore, the seal ring 170 is not deformed in the radially inner direction (y-axis positive direction in FIG. 22) so that there is no positional change relative to the y-axis direction.

(When Discharge Pressure is Medium: FIG. 23)

When the discharge pressure has increased up to a medium pressure, the force Fx acting on the seal ring 170 from the discharge region Dout becomes greater to exceed the resultant force N of friction forces. Thereby, the seal ring 170 is deformed and moved in the radially inner direction (y-axis positive direction). Also, the backup ring 190a is deformed and moved in the radially inner direction so that the clearance h5 becomes equal to 0. Hence, the backup ring 190a becomes in contact with the shoulder portion 159. A z-axis negative side portion 176 of the seal ring 170 has not yet become in contact with the shoulder portion 159 (h6>0).

(When Discharge Pressure is High: FIG. 24)

When the discharge pressure has increased up to a high pressure, the z-axis negative side portion 176 of the seal ring 170 also becomes in contact with the shoulder portion 159 (h6=0). The backup ring 190a has already been in contact with the shoulder portion 159 from the time of medium pressure (h5=0). A part of the z-axis negative side portion 176 of the seal ring 170 is not jammed or caught between the backup ring 190a and the shoulder portion 159.

Comparative Example

Figure 25:
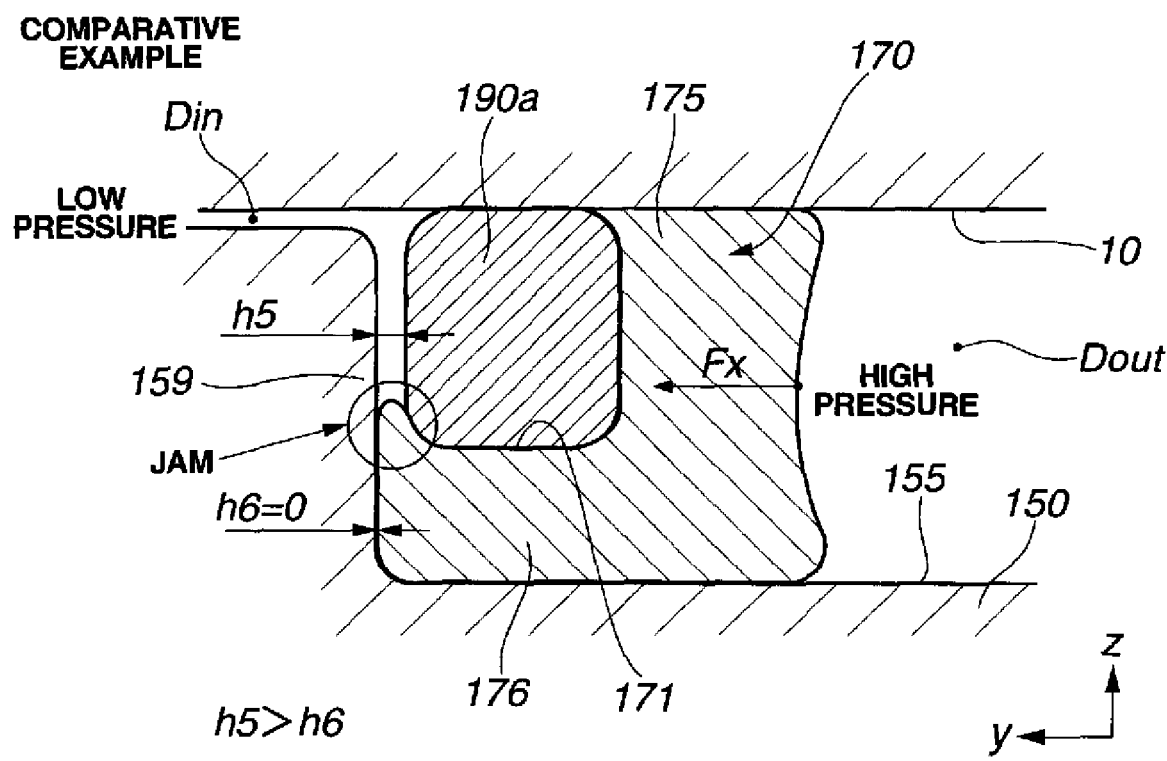
FIG. 25 is a y-z plane cross-sectional view of a comparative example when the discharge pressure is high.

FIG. 25 is a y-z plane cross-sectional view of a comparative example when the discharge pressure is high. In this comparative example, before the assembling to the housing 10, the clearance h5 between the shoulder portion 159 and the backup ring 190a is greater than the clearance h6 between the shoulder portion 159 and the seal ring 170 (h5>h6). Accordingly, when the discharge pressure increases, the z-axis negative side portion 176 of the seal ring 170 becomes in contact with the shoulder portion 159 earlier than the backup ring 190a (h5>0, h6=0). Thereby, a material constituting the z-axis negative side portion 176 of the seal ring 170 is compressed and then jammed (pushed out) into the clearance h5 between the backup ring 190a and the shoulder portion 159. That is, a part of material of the seal ring 170 is sucked and caught in the clearance h5 between the backup ring 190a and the shoulder portion 159. On the other hand, in the first embodiment according to the present invention, because the clearance h5 is designed to be smaller than the clearance h6 (h5<h6), such a jamming does not occur.

[Change of Side-Plate Pressing Force of Seal Ring]

Figure 26:
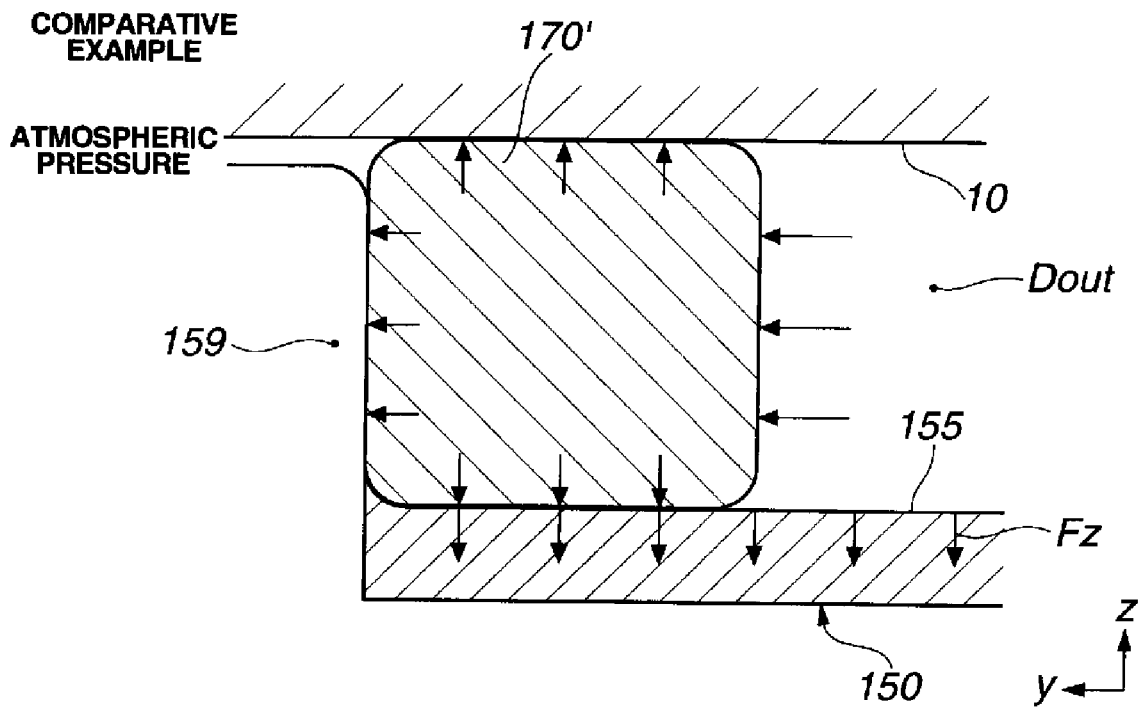
FIG. 26 is a view showing a pressing force of the seal ring against the side plate in a comparative example.
Figure 27:
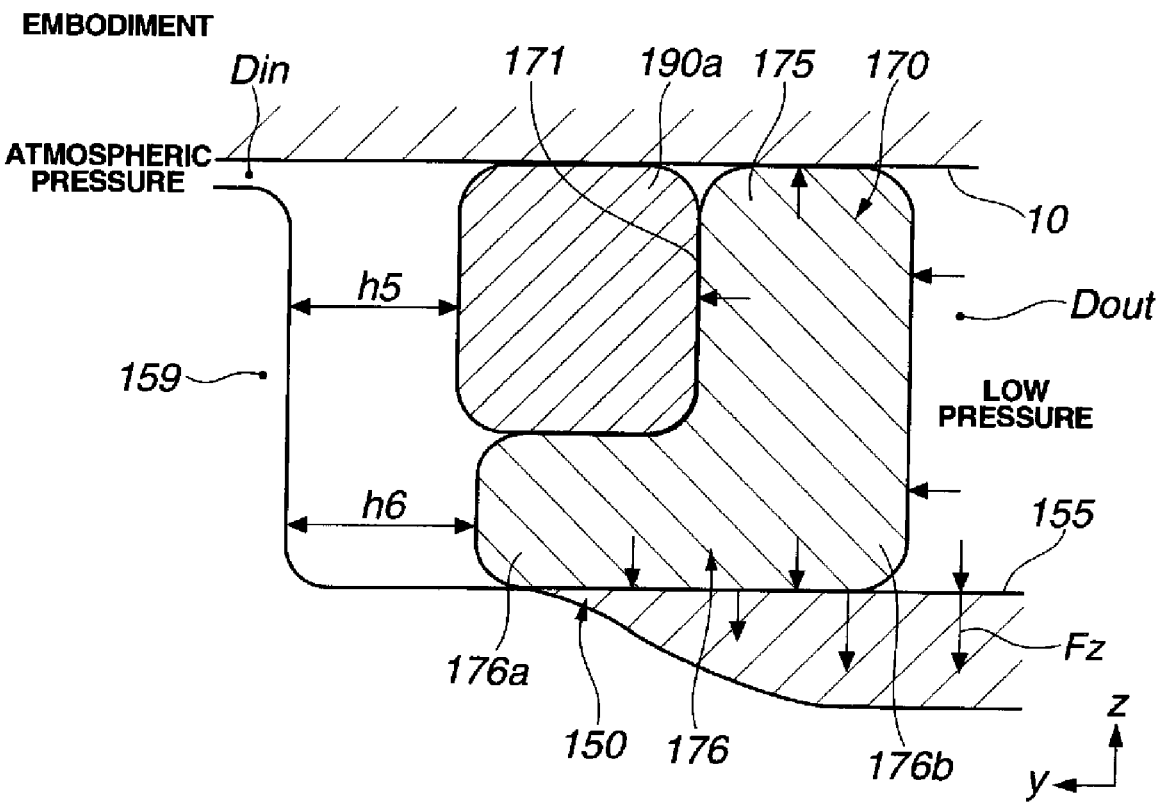
FIG. 27 is a view showing the pressing force of the seal ring against the side plate when the discharge pressure is low in the embodiment according to the present invention.
Figure 28:
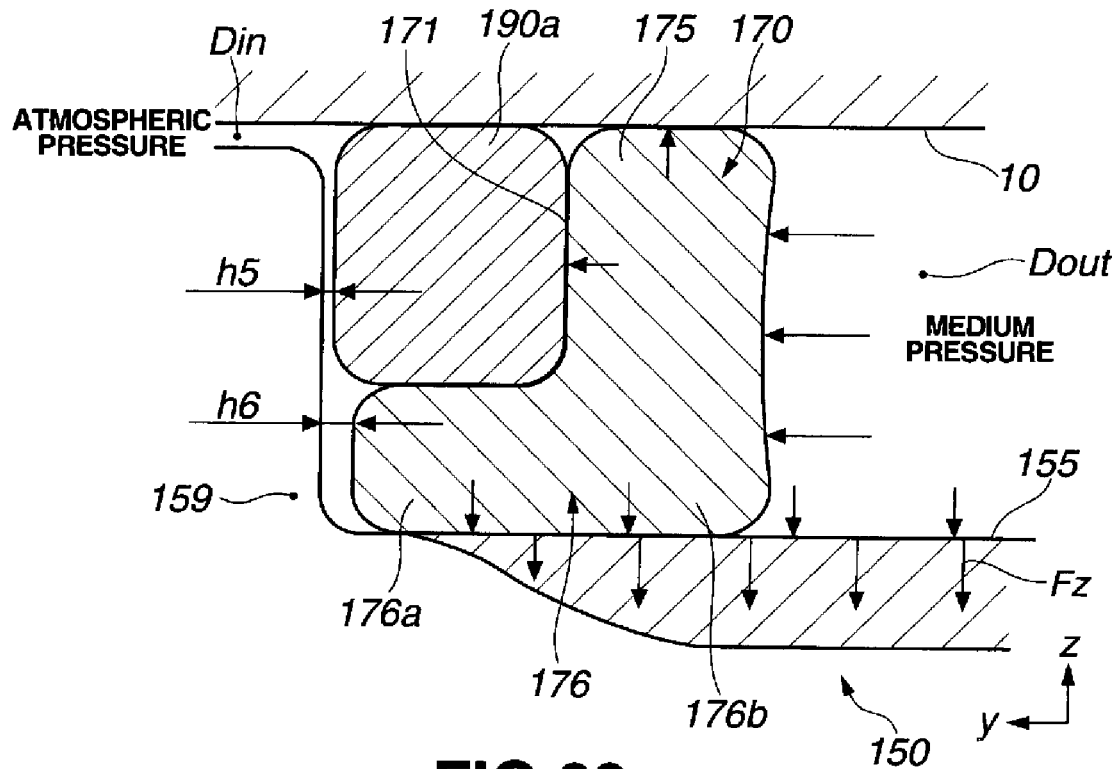
FIG. 28 is a view showing the pressing force of the seal ring against the side plate when the discharge pressure is medium in the embodiment according to the present invention.
Figure 29:
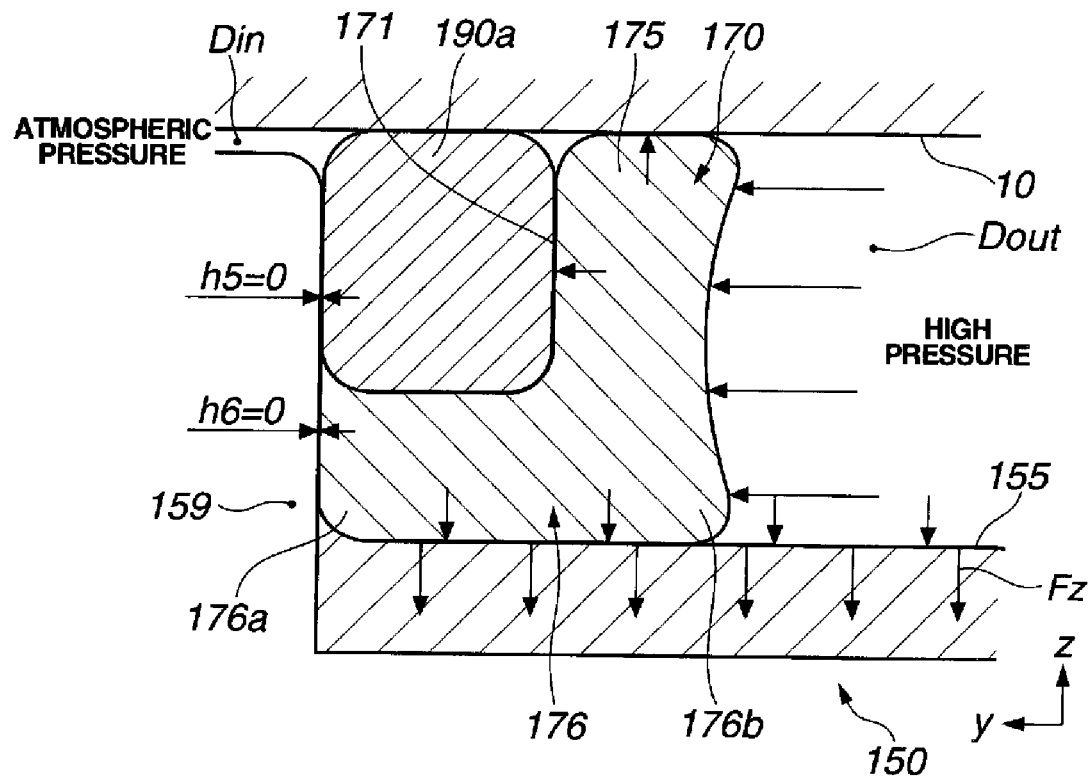
FIG. 29 is a view showing the pressing force of the seal ring against the side plate when the discharge pressure is high in the embodiment according to the present invention.

FIGS. 26 to 29 are views showing a pressing force Fz of the seal ring 170 against the side plate 150. FIG. 26 shows a comparative example. FIGS. 27 to 29 show the embodiment according to the present invention. FIG. 27 shows a state when the discharge pressure is low. FIG. 28 shows a state when the discharge pressure is medium. FIG. 29 shows a state when the discharge pressure is high.

Comparative Example

In this comparative example; there is not provided the backup ring 190a, and a seal ring 170' is already in contact with the shoulder portion 159 before the assembling. When operating the pump, the seal ring 170' is elastically deformed by receiving fluid pressure from the discharge region Dout. However at this time, there is no space to which a part of material of the seal ring 170' moves (escapes) because the seal ring 170' has already been in contact with the shoulder portion 159.

Accordingly, the elastically-deformed seal ring 170' presses the side plate 150 in the z-axis negative direction in an area of z-axis negative-side whole surface of the elastically-deformed seal ring 170', as shown in FIG. 26. This pressing force Fz causes a friction between the side plate 50 and the drive- and driven-side gears 130 and 140.

Embodiment According to Present Invention

In the first embodiment according to the present invention; there are provided the backup ring 190a, the clearance h5 between the backup ring 190a and the shoulder portion 159 under the state of pre-assembling, and the clearance h6 between the shoulder portion 159 and the z-axis negative side portion 176 of the seal ring 170 under the state of pre-assembling.

Therefore, the seal ring 170 does not immediately become in contact with the shoulder portion 159 even if the seal ring 170 is pressed from the discharge region Dout. At this time, the clearance h6 located on a y-axis positive side of the z-axis negative side portion 176 of the seal ring 170 functions as the space to which a part of material of the seal ring 170 moves (escapes).

The z-axis negative side portion 176 of the seal ring 170 includes a contact portion 176a which abuts on the backup ring 190a, and a noncontact portion 176b which does not abut on the backup ring 190a. The housing 10 and the side plate 150 exist on z-axis directional both sides of the noncontact portion 176b, and the contact portion 176a exists on a y-axis positive side of the noncontact portion 176b. Hence, there is no space to which a part of material constituting the noncontact portion 176b moves (escapes). Thus, in the area of noncontact portion 176b, a part of material constituting the noncontact portion 176b which has been elastically deformed presses the side plate 150 in the z-axis negative direction.

On the other hand, in the area of the contact portion 176a, a part of material constituting the contact portion 176a escapes in the y-axis positive direction because of the presence of the clearance h6. Hence, in the area of the contact portion 176a, the side plate 150 is not pressed in the z-axis negative direction. By just that much, the pressing force Fz of the seal ring 170 against the side plate 150 is reduced so that a friction torque T between the side plate 150 and the drive-side and driven-side gears 130 and 140 is reduced.

When the clearance h6 between the shoulder portion 159 and the contact portion 176a of the z-axis negative side portion 176 of the seal ring 170 becomes equal to 0 (at the time of high discharge pressure), the constant pressing force Fz is applied from z-axis negative-side whole surface of the seal ring 170 in the z-axis negative direction, in the similar manner as the comparative example.

When the clearance h6 remains greater than 0 (at the time of low or medium discharge pressure), as mentioned above, the pressing force Fz acting on the side plate 150 is smaller than that in the comparative example. Therefore, the first embodiment according to the present invention is advantageous from a view point of friction when the discharge pressure is low or medium, as compared with the comparative example.

(Comparison of Friction and Leak Amount)

Figure 30:
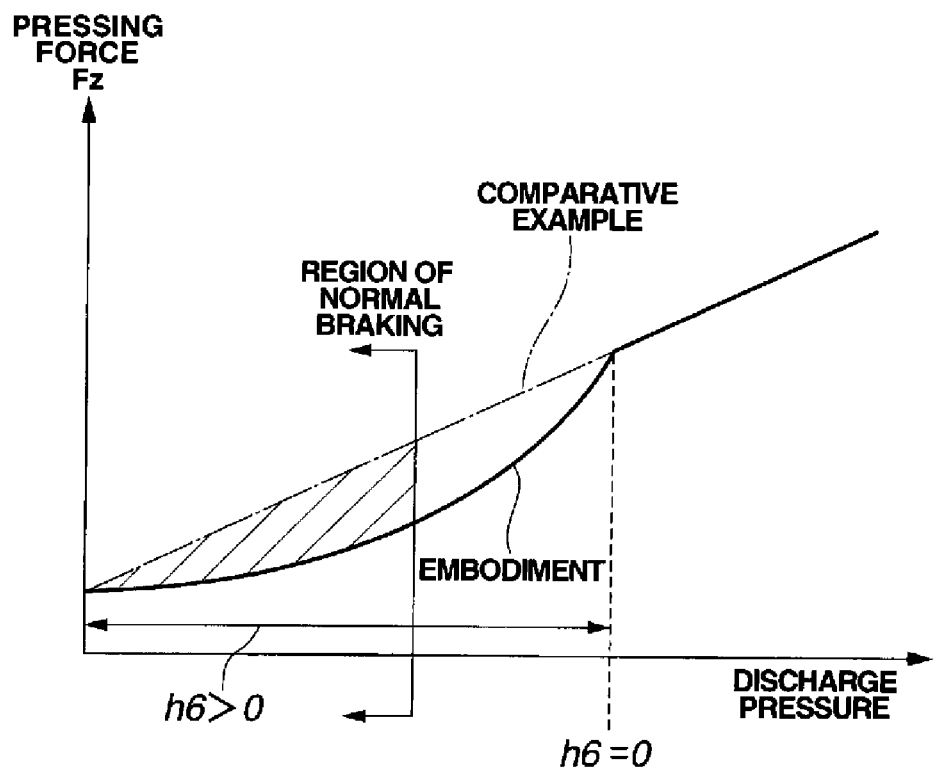
FIG. 30 is a view showing a comparison between the comparative example and the embodiment according to the present invention (a relation between the discharge pressure and the pressing force).
Figure 31:
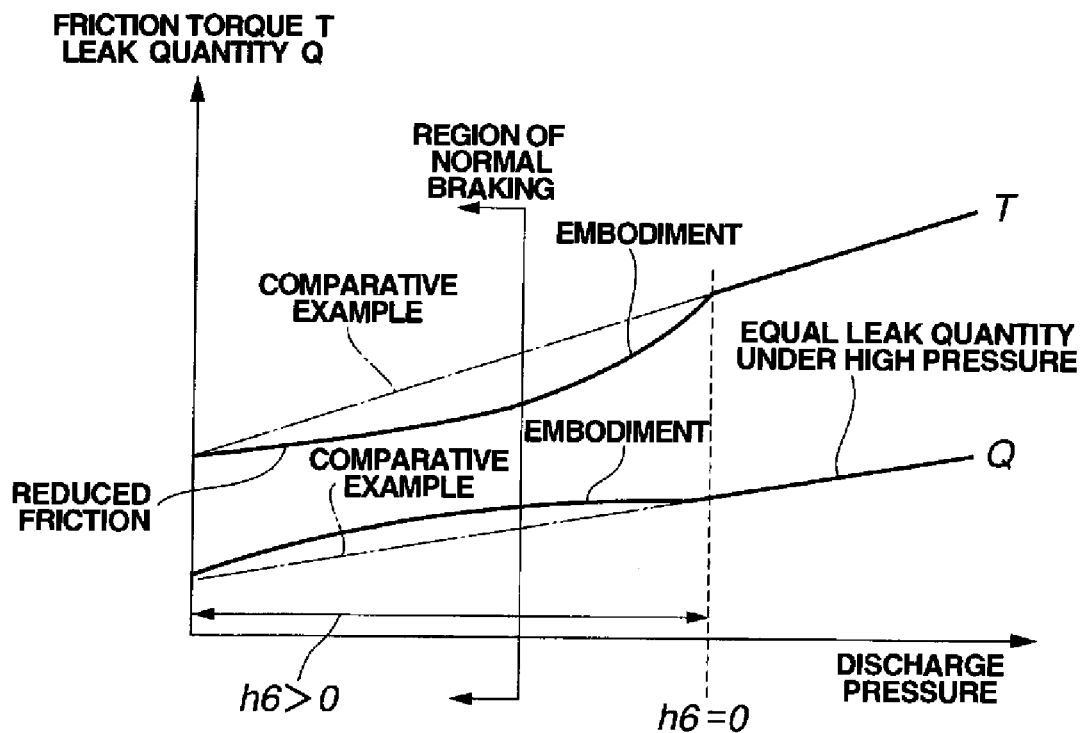
FIG. 31 is a view showing the comparison between the comparative example and the embodiment according to the present invention (a relation between the discharge pressure and a friction torque and leak amount).

FIGS. 30 and 31 are views showing a comparison between the comparative example and the first embodiment according to the present invention. FIG. 30 shows a relation between the discharge pressure and the pressing force Fz. FIG. 31 shows a relation between the discharge pressure and the friction torque T and a leak amount Q.

As mentioned above, in the case where the clearance h6 is secured between the z-axis negative side portion 176 of the seal ring 170 and the shoulder portion 159 in the first embodiment, the pressing force Fz is smaller than that in the comparative example. Therefore, when the discharge pressure ranges below a level bringing the clearance h6 to 0 (h6=0), the pressing force Fz and the friction torque T in the first embodiment are smaller than those of the comparative example.

Moreover, when the pressing force Fz becomes small, the sealing performance between the side plate 150 and the drive-side and driven-side gears 130 and 140 becomes low. Hence, the leak amount Q in the first embodiment according to the present invention increases by a greater degree than that in the comparative example as shown in FIG. 31. However, the pressing force Fz when the discharge pressure is high (h6=0) in the first embodiment is substantially equal to that in the comparative example, and hence, the leak amount Q at the time of high discharge pressure in the first embodiment is equal to that in the comparative example.

If an upper limit of a usage region for normal braking is set within a range capable of maintaining the clearance h6 to be greater than 0 (h6>0), the clearance h6 greater than 0 is secured always during the normal braking so that the friction torque T is suppressed to enhance a mechanical efficiency of the pump assembly 100. Moreover, when a high (discharge) pressure is used, e.g., at the time of harsh braking; the clearance h6 becomes equal to 0 so that the leak amount Q is reduced to a level equivalent to that of the comparative example, and thereby a responsivity at the time of harsh braking is favorably ensured.

Effects of Structure in First Embodiment

In the first embodiment, the seal apparatus of gear pump includes the seal ring (seal member) 170, 180 which is arranged between the housing 10 and the side plate 150, 160, which is arranged at the shoulder portion 159, 169 of the side plate 150, 160 or the housing 10, and which separates the suction region Din (low pressure area) from the discharge region Dout (high pressure area) in the radial direction of the gear 130, 140; and includes the backup ring (backup member) 190a, 190b reinforcing the seal ring 170, 180. The shoulder portion 159, 169 is located in the suction region Din, and at least a part of the seal ring 170, 180 faces the discharge region Dout. The backup ring 190a, 190b faces the suction region Din and also faces the tip portion 159a, 169a of the shoulder portion 159, 169. The seal apparatus of gear pump further includes the clearance h6 (containing portion) formed between the root portion 159b of the shoulder portion 159, 169 and the seal ring 170, 180 to be capable of containing a part of the seal ring 170, 180 at least when the seal ring 170, 180 is elastically deformed.

Accordingly, a seal apparatus of gear pump can be achieved in which the jamming (bitten state) of the seal member is prevented while suppressing the increase in friction.

Moreover, in the first embodiment, the seal ring 170, 180 is substantially in the shape of a ring and is substantially in the shape of an L in cross section; and the backup ring 190a, 190b is in the shape of a ring substantially same as the shape of the seal ring 170, 180, and is located inside the groove 171 of the seal ring 170, 180 which forms the substantially L-shaped cross section of the seal ring 170, 180.

Accordingly, the backup ring 190a, 190b can be held easily and reliably.

Moreover, in the first embodiment, the seal ring 170, 180 and the backup ring 190a, 190b are integrally attached to each other.

Moreover, in the first embodiment, the clearance h6 is provided between the seal ring 170, 180 and the shoulder portion 159, 169.

Accordingly, it is reliably suppressed that the seal ring 170, 180 is jammed into (bitten) between the backup ring 190a, 190b and the shoulder portion 159, 169.

Moreover, in the first embodiment, the clearances h6 and h5 exist between the seal ring 170, 180 and the shoulder portion 159, 169 and between the backup ring 190a, 190b and the shoulder portion 159, 169, at least when the discharge region Dout has a pressure level lower than or equal to a pressure level of the suction region Din; and the seal ring 170, 180 and the backup ring 190a, 190b are configured to move toward the shoulder portion 159, 169 (toward the suction region Din: in the radially inner direction: in y-axis positive direction) and thereby the backup ring 190a, 190b becomes in contact with the shoulder portion 159, 169 earlier than the seal ring 170, 180, when the pressure level of the discharge region Dout becomes higher than the pressure level of the suction region Din.

Accordingly, a seal apparatus of gear pump can be achieved in which the jamming (bitten state) of the seal member is prevented reliably while suppressing the increase in friction.

Moreover, in the first embodiment, the seal ring 170, 180 is in contact with the shoulder portion 159, 169 through the plurality of points a, b and c in the circumferential direction of the substantially ring-shaped seal ring 170, 180, and each of the plurality of points a, b and c has the predetermined tightening contact width in the circumferential direction.

Accordingly, the backup ring 190a, 190b and the seal ring 170, 180 can be reliably attached or fitted to the shoulder portion 159, 169 with the tightening forces applied at the points a, b and c. Additionally, since the space (clearance h5, h6) is provided at each of the points d, e and f, the jamming (bitten state) of the seal ring 170, 180 can be prevented.

Moreover, in the first embodiment, the seal ring 170, 180 is configured to apply an elastic force at least to the backup ring 190a, 190b. Accordingly, the jamming can be reliably prevented.

Moreover, in the first embodiment, the backup ring 190a, 190b is configured to being elastically deformed by the elastic force of the seal ring 170, 180, in two directions of the direction toward the housing 10 and the direction toward the clearance (space) h5, h6.

Accordingly, a seal apparatus of gear pump can be achieved in which the jamming of the seal member is reliably prevented while suppressing the increase in friction.

Moreover, in the first embodiment, the clearance h6 (>h5) is formed between the seal ring 170, 180 and the shoulder portion 159, 169. Accordingly, a seal apparatus of gear pump can be achieved in which the jamming of the seal member is prevented reliably while suppressing the increase in friction.

Moreover, in the first embodiment, the backup ring 190a, 190b and the seal ring 170, 180 are fitted to each other and thereby are integrated with each other.

Accordingly, the backup ring 190a, 190b and the seal ring 170, 180 can be prevented from being detached from each other.

Moreover, in the first embodiment, the backup ring 190a, 190b and the seal ring 170, 180 are formed as separate members (formed of different materials). Accordingly, the elastic deformation of the seal ring 170, 180 is easily generated by the discharge pressure.

Hereinafter, modified examples of the first embodiment according to the present invention will be explained.

First Modified Example of First Embodiment

Figure 32:
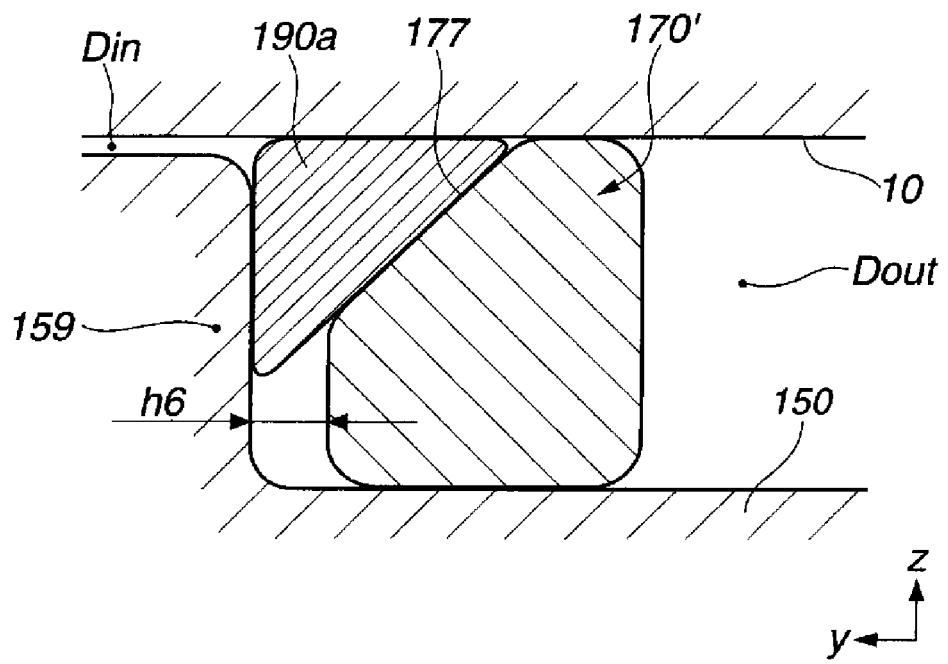
FIG. 32 is a view showing a first modified example of the first embodiment.

FIG. 32 is a view showing an example in which the cross section of seal ring 170 is modified by forming a shape including a chamfer portion 177 provided by chamfering one diagonal corner of the rectangular seal ring 170. The backup ring 190a is formed substantially in a triangular shape in cross section, and is placed on the chamfer portion 177 of the seal ring 170'.

Second Modified Example of First Embodiment

Figure 33:
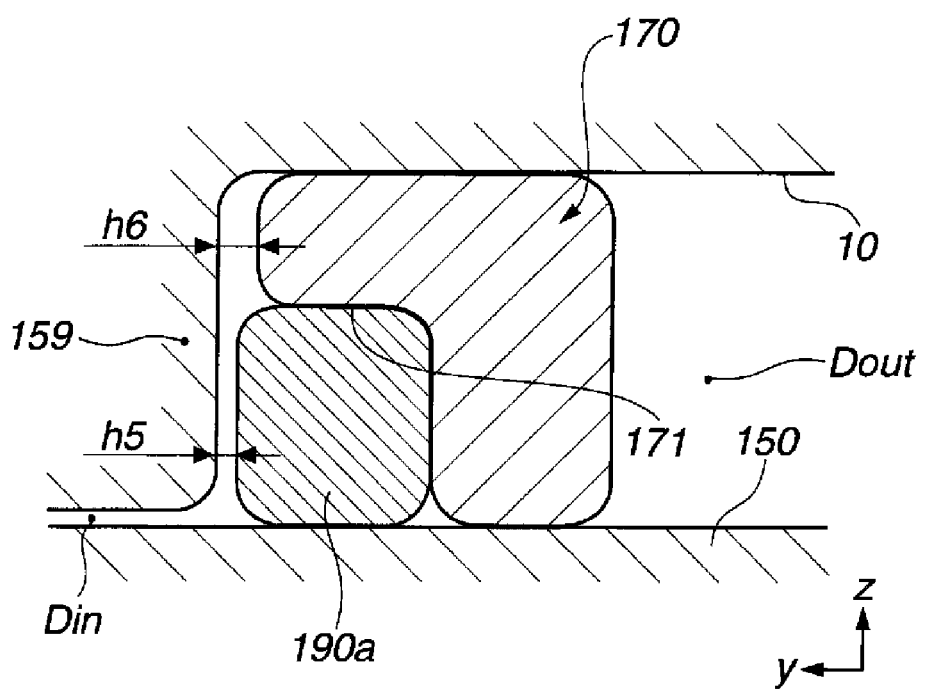
FIG. 33 is a view showing a second modified example of the first embodiment.

FIG. 33 is a view showing an example in which the positions of the seal ring 170 and backup ring 190a in the above-explained pre-modified example of the first embodiment are modified relative to the z-axis direction.

Third Modified Example of First Embodiment

Figure 34:
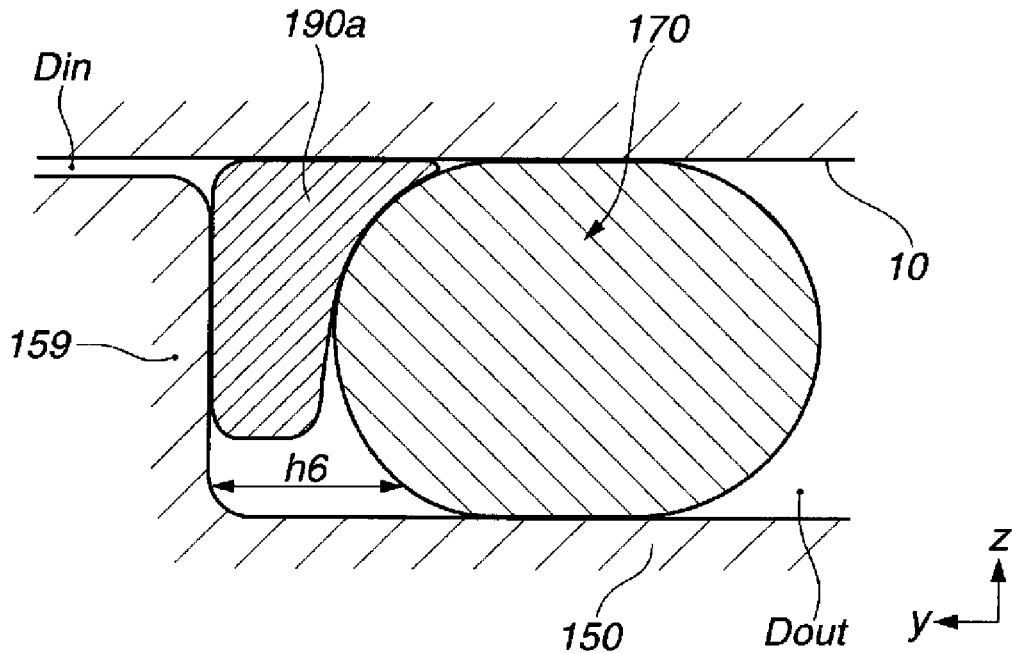
FIG. 34 is a view showing a third modified example of the first embodiment.

FIG. 34 is a view showing an example in which the seal ring 170 is modified to a substantially circular shape in cross section.

Fourth Modified Example of First Embodiment

Figure 35:
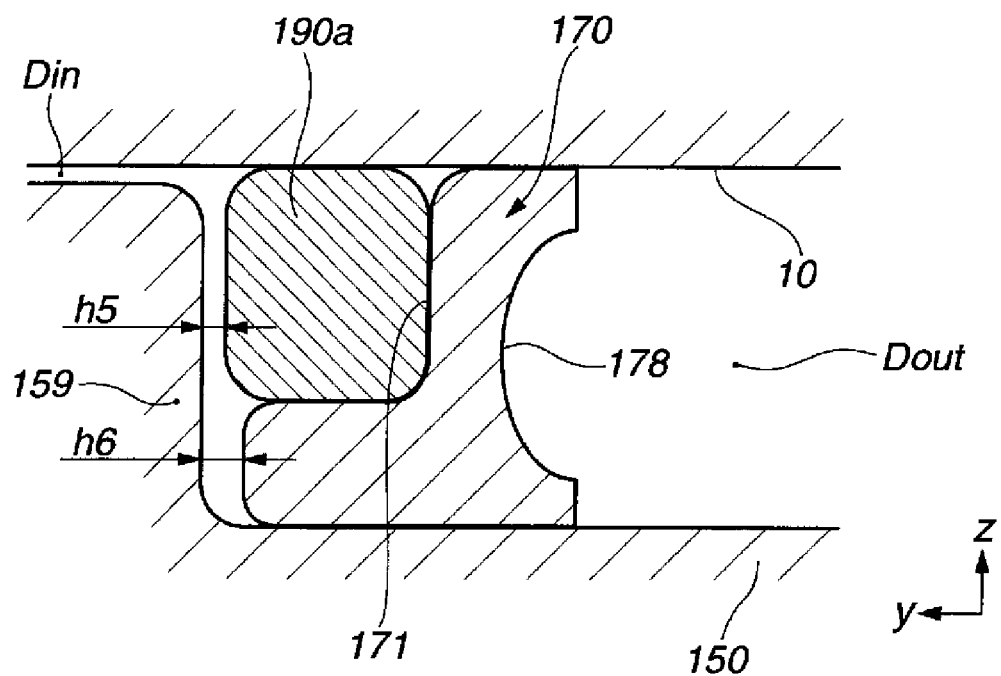
FIG. 35 is a view showing a fourth modified example of the first embodiment.
Figure 36:
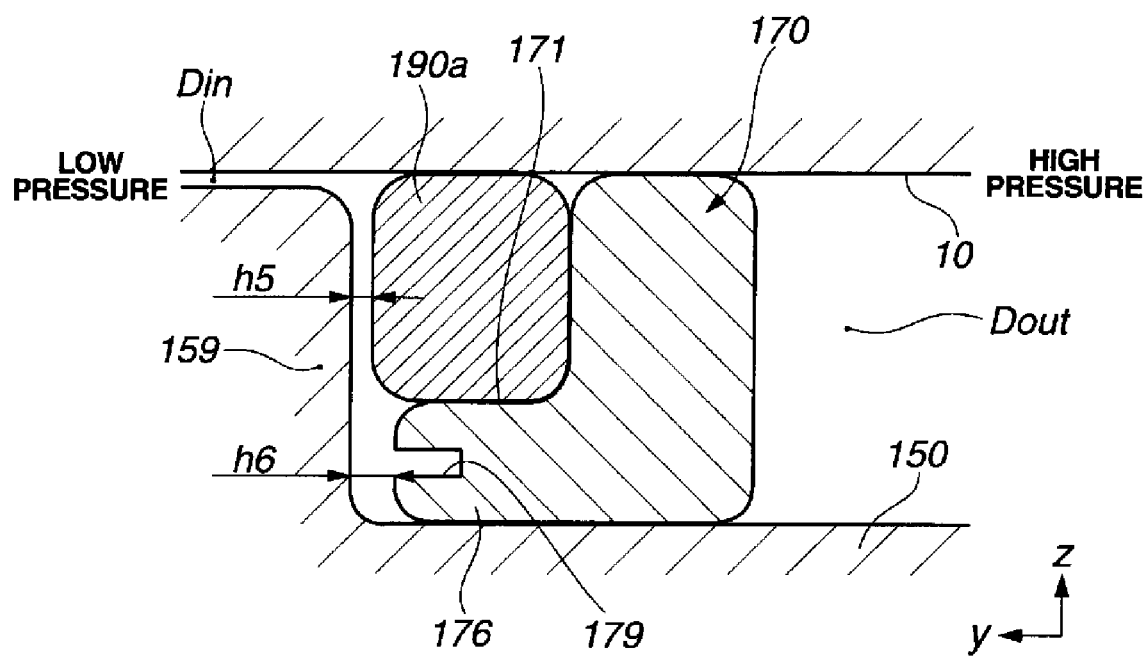
FIG. 36 is a view showing a second embodiment according to the present invention (a concave portion is provided as a receiving or containing portion).

FIG. 35 is a view showing an example in which the seal ring 170 is modified to be formed with a concave portion 178 in a y-axis negative side surface of the seal ring 170. Thereby, the seal ring 170 becomes susceptible to the discharge pressure.

In each of these first to fourth modified examples, the clearance h6 between the shoulder portion 159 and the seal ring 170 is secured. Accordingly, the similar effects as the pre-modified example of the first example can be obtained also in the first to fourth modified examples of the first example.

Second Embodiment

Next, a second embodiment according to the present invention will be explained below. A basic structure of the second embodiment is similar as the first embodiment. In the second embodiment, the seal ring 170 is formed with a deformation-permissible concave portion 179. This deformation-permissible concave portion 179 is provided in the z-axis negative side portion 176 of the seal ring 170 so as to be dented in the y-axis negative direction. Thereby, when the seal ring 170 is pressed by the discharge pressure, a part of material constituting the seal ring 170 moves (escapes) into this deformation-permissible concave portion 179 in addition to the clearance h6.

Figure 37:
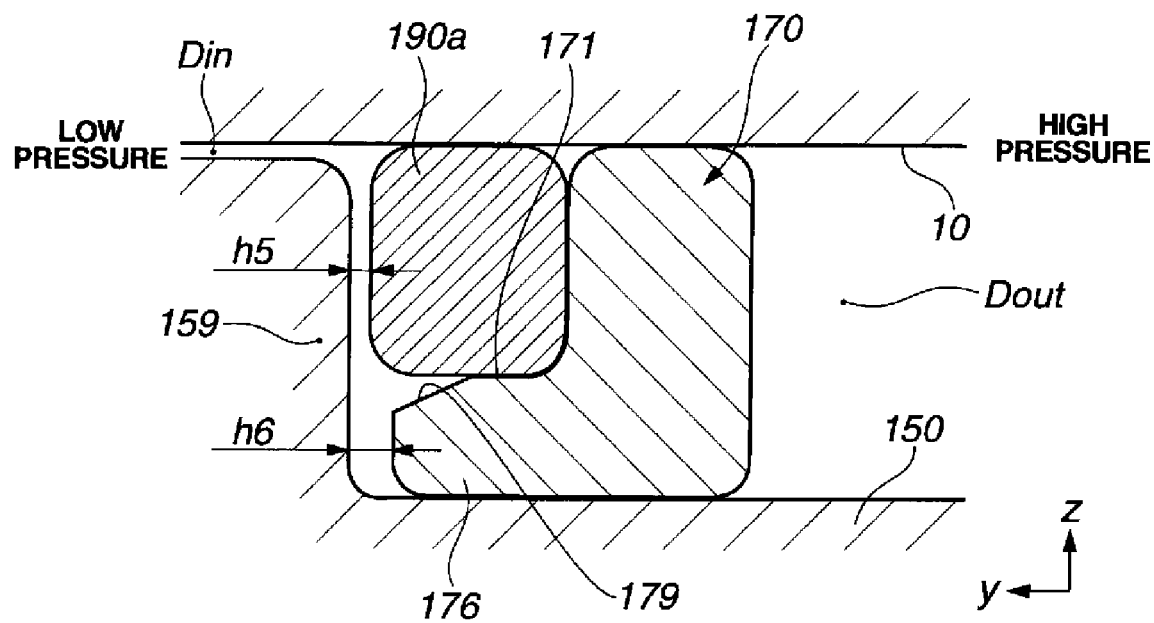
FIG. 37 is a view showing a modified example of the second embodiment.
Figure 38:
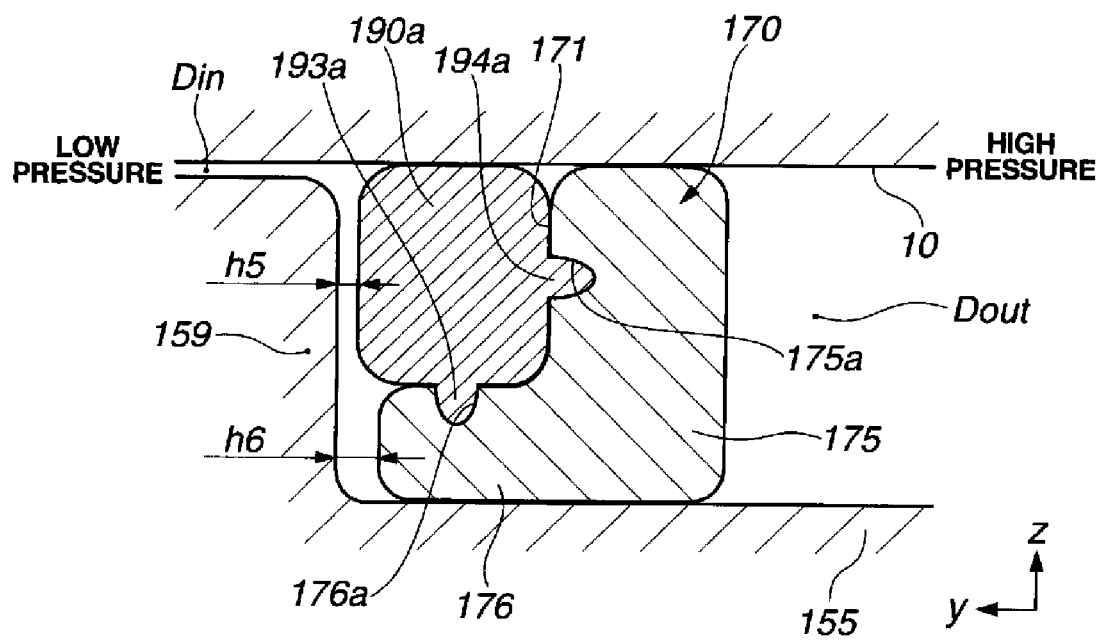
FIG. 38 is a view showing a third embodiment according to the present invention (an engaging portion is provided).

In the second embodiment, the seal apparatus of gear pump includes the deformation-permissible concave portion 179 as the containing portion (in other words, an absorbing portion for the deformed part of the seal ring 170, 180). The deformation-permissible concave portion 179 is formed inside the seal ring 170, 180, and is exposed to the suction region Din. Accordingly, the similar effects as the first embodiment can be obtained also in the second embodiment. It is noted that the deformation-permissible concave portion 179 may be provided as any other shape capable of allowing a part of material to escape. For example, the deformation-permissible concave portion 179 may be provided by cutting out a part of the z-axis negative side portion 176 of the seal ring 170 as shown in FIG. 37.

Third Embodiment

Next, a third embodiment according to the present invention will be explained below. In the third embodiment; the seal ring 170 includes engaging portions 175a and 176a, and the backup ring 190a includes engaging portions 193a and 194a. The seal ring 170 is connected integrally with the backup ring 190a through these engaging portions 175a, 176a, 193a and 194a. Accordingly, it can be certainly avoided that the seal ring 170 and the backup ring 190a are detached from each other.

Fourth Embodiment

Figure 39:
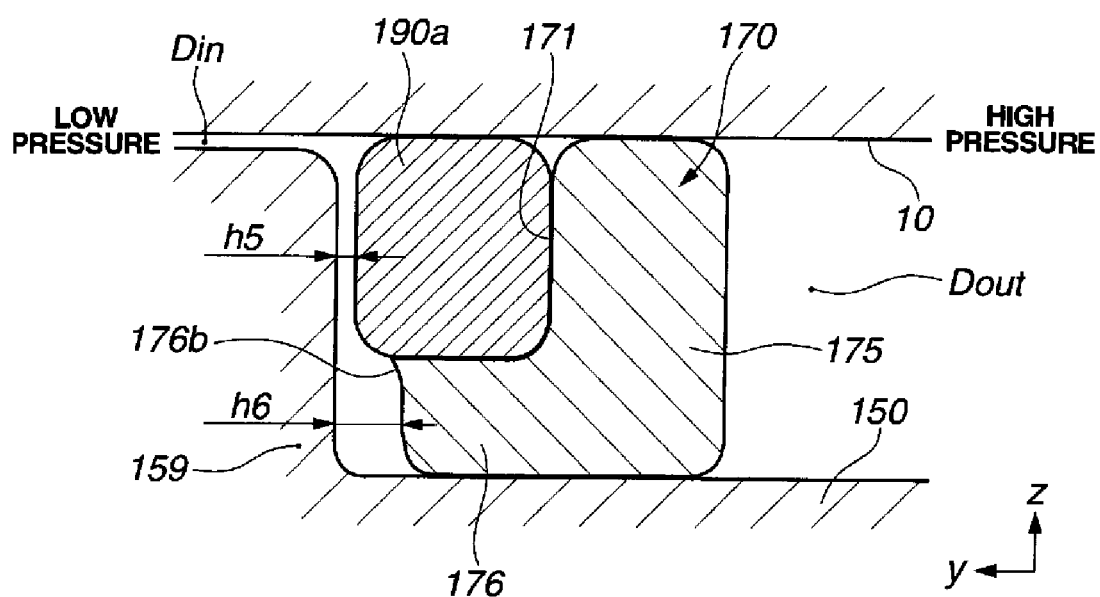
FIG. 39 is a cross-sectional view near the seal ring and the backup ring in a fourth embodiment according to the present invention.
Figure 40:
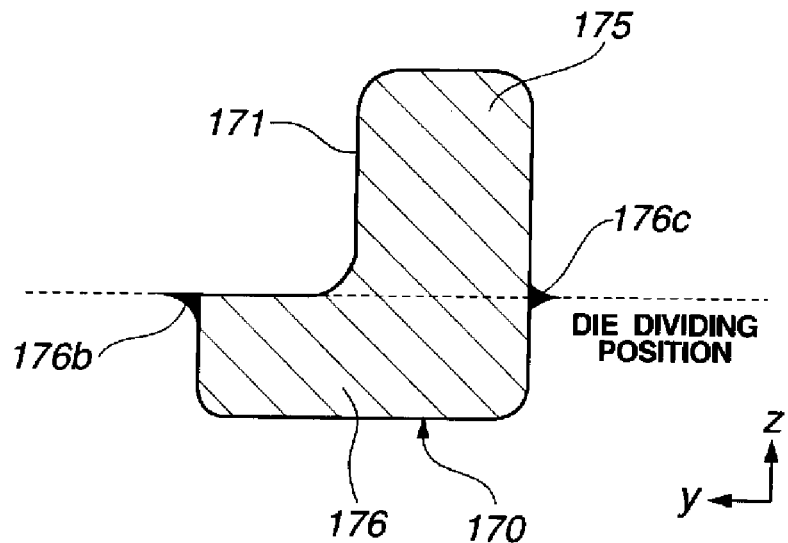
FIG. 40 is a cross sectional view when the seal ring is manufactured in the fourth embodiment.

Next, a fourth embodiment according to the present invention will be explained below. FIG. 39 is a cross-sectional view near the seal ring 170 and backup ring 190a in the fourth embodiment. FIG. 40 is a cross sectional view when the seal ring 170 is manufactured. In the fourth embodiment, the seal ring 170 includes a movement restricting portion 176b functioning to restrict a movement (moving distance) in the y-axis negative direction (toward the shoulder portion 159).

The seal ring 170 is manufactured or formed by means of die forming, by combining a die (mold) for forming a z-axis positive side portion 175 of the seal ring 170 with a die for forming the z-axis negative side portion 176 of the seal ring 170. At the time of the forming of seal ring 170, burrs 176b and 176c are produced at a dividing position between the two dies (at a z-axis positive end portion of the z-axis negative side portion 176). The burr 176b produced on the y-axis positive side of the z-axis negative side portion 176 is used as the movement restricting portion 176b, substantially without change. On the other hand, the burr 176c produced on the y-axis negative side of the z-axis negative side portion 176 is eliminated.

Therefore, when the seal ring 170 moves in the y-axis positive direction; this movement restricting portion 176b becomes in contact with the shoulder portion 159, and thereby the movement (moving distance) of the z-axis negative side portion 176 of the seal ring 170 is restricted or limited in the y-axis positive direction. Accordingly, the seal ring 170 is prevented from being jammed into the clearance h5 (i.e., sandwiched) between the shoulder portion 159 and the backup ring 190a.

Figure 41:
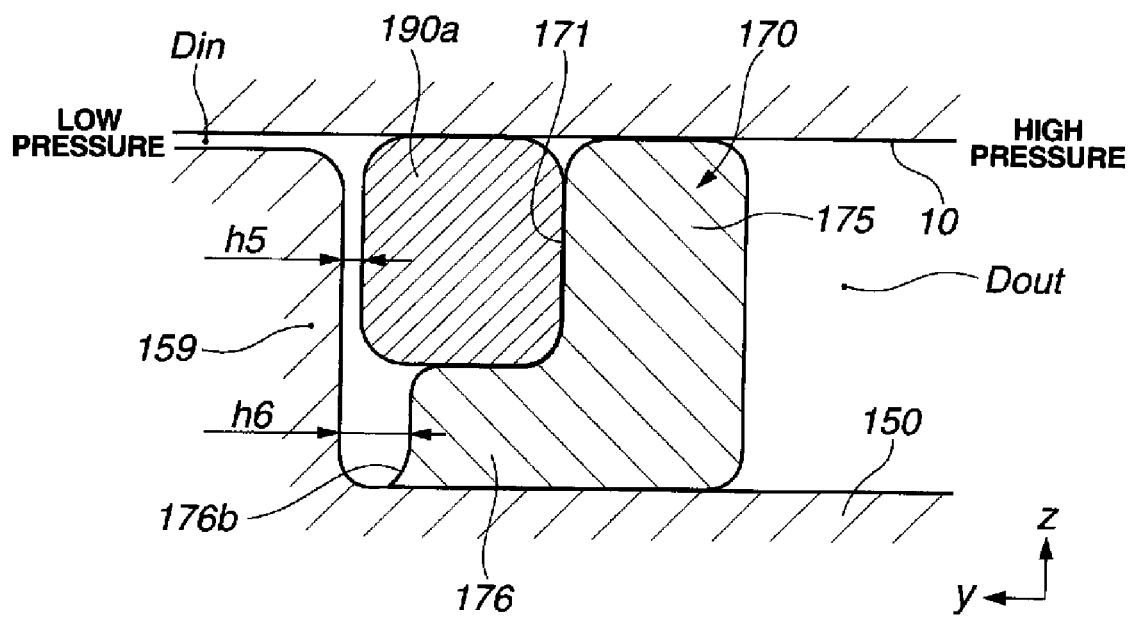
FIG. 41 is a view showing a modified example of the fourth embodiment.

Moreover, even in case where the jamming is caused by any chance, the movement restricting portion 176b which is the burr unnecessary by nature is jammed or bitten between the shoulder portion 159 and the backup ring 190a. Hence, even in this case, a damage of the seal ring 170 itself is small. Accordingly, this embodiment can produce the similar effects as the first embodiment. It is noted that the movement restricting portion 176b may be provided on a z-axis negative end portion of the z-axis negative side portion 176 as shown in FIG. 41.

Fifth Embodiment

Figure 42:
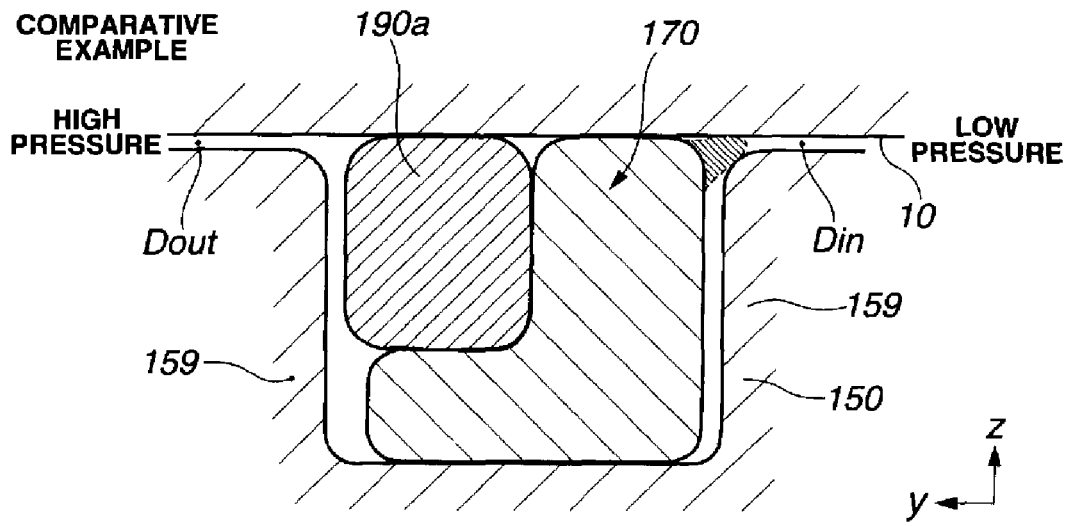
FIG. 42 shows a comparative example to a fifth embodiment according to the present invention.
Figure 43:
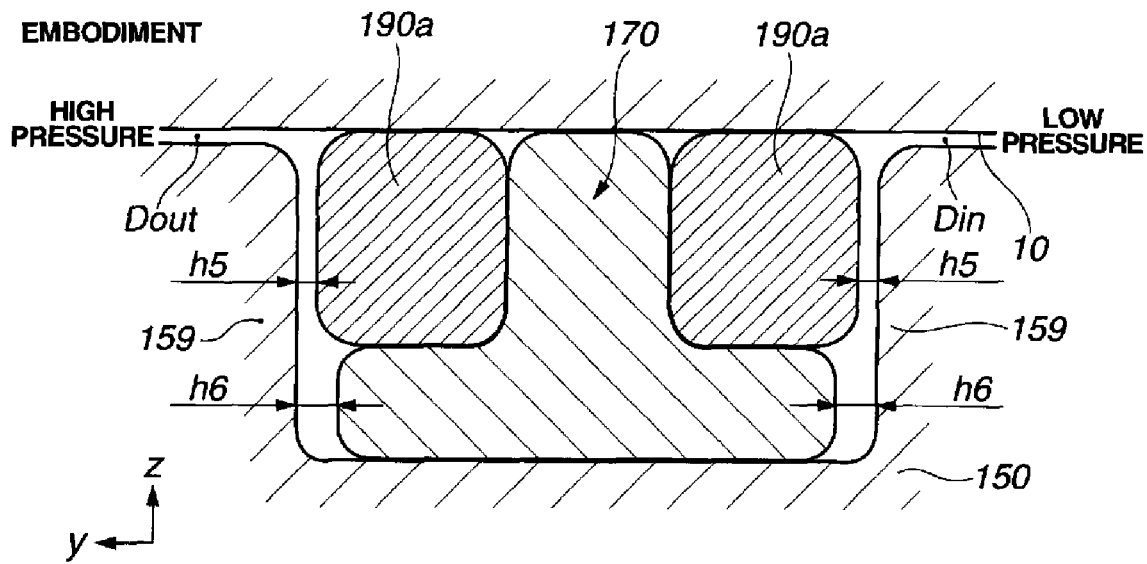
FIG. 43 shows the fifth embodiment according to the present invention (shoulder portions are provided on y-axis directional both sides of the seal ring).

Next, a fifth embodiment according to the present invention will be explained below. FIGS. 42 and 43 are views showing an example in which the shoulder portions 159 are provided on y-axis directional both sides of the seal ring 170. FIG. 42 shows a comparative example. FIG. 43 shows the fifth embodiment according to the present invention. In FIGS. 42 and 43, the suction region Din is located on the y-axis negative side of the seal ring 170, and the discharge region Dout is located on the y-axis positive side of the seal ring 170, contrary to the first to fourth embodiments.

Comparative Example

As shown in FIG. 42, the shoulder portions 159 are provided on the y-axis directional both sides of the L-shaped seal ring 170. When the locations of the suction region Din and the discharge region Dout are reversed (i.e., replaced with each other) because of a reverse rotation of the pump or the like, the seal ring 170 is pressed by the discharge pressure from the y-axis positive side and thereby is jammed into the suction region Din.

Embodiment According to the Present Invention

In the fifth embodiment according to the present invention, as shown in FIG. 43; the seal ring 170 is in the form of inverted T, and the backup rings 190a are provided on the y-axis directional both sides of the seal ring 170. Thereby, even if the locations of the suction region Din and the discharge region Dout are reversed by the reverse rotation of the pump or the like under the condition where the shoulder portions 159 are provided on the y-axis directional both sides of the seal ring 170, the seal ring 170 can be prevented from being jammed.

Sixth Embodiment

Next, a sixth embodiment according to the present invention will be explained below. In the sixth embodiment, the gear pump P according to the present invention is used for increasing a pressure of wheel cylinder in a brake system.

[Hydraulic Circuit]

Figure 44:
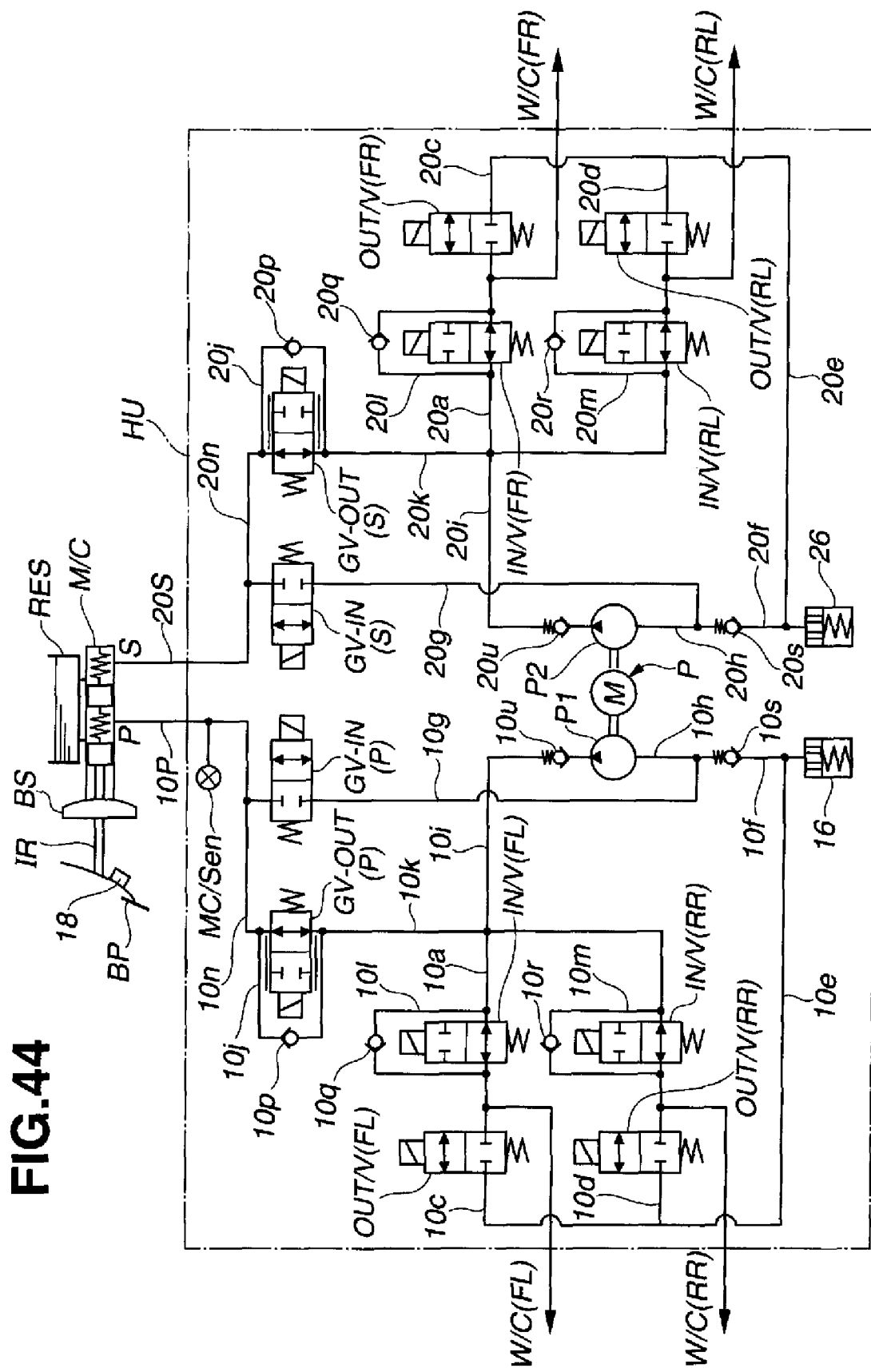
FIG. 44 is a configuration view of a hydraulic circuit to which the pump according to the present invention is applied.

FIG. 44 is a configuration view of hydraulic circuit of a hydraulic unit HU to which the pump P according to the present invention is applied. The hydraulic unit HU is connected with wheel cylinders W/C and a master cylinder M/C.

The brake circuit can be divided into independent two channels (two lines), namely a channel P and a channel S. That is, the brake circuit includes brake circuits 10P and 20S respectively corresponding to the channels P and S. The brake circuit 10P is connected with a wheel cylinder W/C(FL) for a front-left wheel and a wheel cylinder W/C(RR) for a rear-right wheel. The brake circuit 20S is connected with a wheel cylinder W/C(FR) for a front-right wheel and a wheel cylinder W/C(RL) for a rear-left wheel. Accordingly, the brake circuits 10P and 20S form a so-called diagonal split layout (X-split layout or X-pipeline structure). However, a brake circuit to which the pump P according to the present invention is applied is not limited to the diagonal-split-layout type brake circuit.

A brake pedal BP transmits a depressing operation of driver through an input rod IR and a brake booster BS to the master cylinder M/C. A brake switch 18 for sensing a presence/absence of the braking operation of the driver is provided to the brake pedal BP.

The mater cylinder M/C is of tandem type, and includes two hydraulic chambers formed in the mater cylinder M/C. These two hydraulic chambers are separated from each other by two master-cylinder pistons arranged back and forth in an axial direction of the mater cylinder M/C, as shown in FIG. 44. Brake fluid is supplied from a reservoir tank RES to the two hydraulic chambers. One of the two hydraulic chambers is connected with the brake circuit 10P, and another of the two hydraulic chambers is connected with the brake circuit 20S.

When the brake pedal BP is depressed, the mater cylinder M/C produces a fluid pressure (hereinafter referred to as, a master cylinder pressure Pmc) according to the depressed amount (degree) of the brake pedal BP, in the above-mentioned two hydraulic chambers. This master cylinder pressure Pmc is supplied to the respective brake circuits 10P and 20S.

A commonly-known cup-shaped seal member is provided on an outer circumferential surface of each of the master-cylinder pistons. At the time of stroke of the pistons, this seal member blocks a communication between the reservoir tank RES and each of the two hydraulic chambers, and thereby, inside pressures of the respective hydraulic chambers can be increased.

At this time, brake fluid is not supplied from the reservoir tank RES to the brake circuits 10P and 20S, but is supplied only from the hydraulic chambers of the mater cylinder M/C to the brake circuits 10P and 20S.

On the other hand, when the brake pedal BP is released (returned), each master-cylinder piston is returned by means of a force of a return spring provided in the hydraulic chamber. Thereby, each hydraulic chamber of the mater cylinder M/C is communicated with the reservoir tank RES by virtue of the structure of the seal member. Accordingly, brake fluid of the reservoir tank RES again becomes capable of being supplied to each hydraulic chamber of the mater cylinder M/C.

An outside gate valve GV-OUT(P) is provided in the brake circuit 10P, and on an oil passage passing from a side of the mater cylinder M/C (hereinafter referred to as, upstream side) toward a side of the wheel cylinder W/C (hereinafter referred to as, downstream side). The outside gate valve GV-OUT(P) is a proportional solenoid valve (electromagnetic valve) of normally-open type. In the brake circuit 10P, an oil passage 10j is connected to the outside gate valve GV-OUT(P) in parallel with the outside gate valve GV-OUT(P).

A check valve 10p is provided on the oil passage 10j, and serves to prevent a flow of brake fluid from the downstream side toward the upstream side. Hereinafter, a portion of the brake circuit 10P which is upstream of the outside gate valve GV-OUT(P) is referred to as a brake circuit 10n, and a portion of the brake circuit 10P which is downstream of the outside gate valve GV-OUT(P) is referred to as a brake circuit 10k.

The brake circuit 10k branches into brake circuits 10a and 10b respectively connected with wheel cylinders W/C(FL) and W/C(RR). A pressure-amplifying valve IN/V(FL) is provided on the brake circuit 10a, and an pressure-amplifying valve IN/V(RR) is provided on the brake circuit 10b. Each of these pressure-amplifying valves IN/V(FL) and IN/V(RR) is a solenoid valve of normally-open type.

An oil passage 101 is connected with the brake circuit 10a in parallel with the pressure-amplifying valve IN/V(FL) as shown in FIG. 44. On the oil passage 10I, a check valve 10q is provided for preventing a flow of brake fluid from the upstream side toward the downstream side. Similarly, on an oil passage 10m connected with the pressure-amplifying valve IN/V(RR) in parallel with the pressure-amplifying valve IN/V(RR), a check valve 10r is provided for preventing a flow of brake fluid from the upstream side toward the downstream side.

A portion of the brake circuit 10a which is downstream of the pressure-amplifying valve IN/V(FL) is connected with a return circuit 10c, and similarly a portion of the brake circuit 10b which is downstream of the pressure-amplifying valve IN/V(RR) is connected with a return circuit 10d. A pressure-reducing valve OUT/V(FL) is provided on the return circuit 10c, and a pressure-reducing valve OUT/V(RR) is provided on the return circuit 10d. Each of the pressure-reducing valves OUT/V(FL) and OUT/V(RR) is an on-off solenoid valve of normally-closed type. The return circuits 10c and 10d flow into each other to form a return circuit 10e. The return circuit 10e is connected with a reservoir 16 provided inside the hydraulic unit HU.

On the other hand, the brake circuit 10n located upstream of the outside gate valve GV-OUT(P) is connected with a suction circuit 10g. An inside gate valve GV-IN(P) is provided on the suction circuit 10g, and serves to switch between a communication and a blocking (i.e., open and close) of the suction circuit 10g. The inside gate valve GV-IN(P) is an on-off solenoid valve of normally-closed type. The suction circuit log flows into a return circuit 10f connected with the reservoir 16, so as to form a suction circuit 10h.

The hydraulic unit HU includes the pump P serving to carry out a suction and a discharge of brake fluid as a hydraulic source other than the mater cylinder M/C. The pump P is a gear pump adapted to be operated by a motor M. The pump P includes a first pump P1 (channel P) and a second pump P2 (channel S).

A suction side of the first pump P1 is connected with the suction circuit 10h. A discharge side of the first pump P1 is connected with a discharge circuit 10i, namely is connected through the discharge circuit 10i with the brake circuit 10k.

A check valve 10s is provided on the return circuit 10f, and serves to prevent a flow of brake fluid from the suction circuit log (the inside gate valve GV-IN(P)) toward the reservoir 16.

A check valve 10u is provided on the discharge circuit 10i, and serves to prevent a flow of brake fluid from the brake circuit 10k (the outside gate valve GV-OUT(P)) or the brake circuits 10a and 10b (the wheel cylinders W/C) toward the first pump P1 (the discharge side).

The hydraulic circuits regarding the brake circuit 20S are constructed in the same manner as those regarding the above-mentioned brake circuit 10P. On the brake circuit 10n located upstream of the inside gate valve GV-IN(P), a master-cylinder pressure sensor MC/Sen is provided for sensing the master cylinder pressure Pmc.

(Brake Control)

The above-mentioned hydraulic unit HU can perform an after-explained brake assist (boost) control under the normal braking, and also perform an automatic brake control such as vehicle behavior control and an anti-skid control.

The vehicle behavior control is a commonly-known technique, in which an actual yaw rate of vehicle is sensed by a yaw rate sensor or the like, a target yaw rate is calculated by using a steering angle sensor or the like, and then a braking force is applied to only a specific road-wheel(s) to bring this actual yaw rate closer to the target yaw rate. The anti-skid control is a commonly-known technique, in which a slip ratio or the like is calculated from a relation between a road-wheel speed and a pseudo-speed of vehicle body, and the pressure of wheel cylinder is controllably increased or decreased to bring this slip ratio closer to a desired value.

When carrying out the automatic brake control such as the vehicle behavior control; the outside gate valve GV-OUT(P) is closed, and the inside gate valve GV-IN(P) is opened, regarding the brake circuit 10P. At the same time, the pump P is driven so that brake fluid is supplied from the mater cylinder M/C through the suction circuits log and 10h and the discharge circuit 10i toward the brake circuits 10a and 10b.

Furthermore, the outside gate valve GV-OUT(P) or the pressure-amplifying valve IN/V(FL) or IN/V(RR) is controlled so as to generate a target wheel-cylinder fluid pressure Pwc* according to a braking force necessary to stabilize the vehicle behavior. It is noted that the same operations are conducted also regarding the brake circuit 20S.

When carrying out the anti-skid control, for example regarding the front-left wheel FL; the pressure-reducing valve OUT/V(FL) connected with the wheel cylinder W/C is opened, and the pressure-amplifying valve IN/V(FL) is closed. Thereby, brake fluid of the wheel cylinder W/C is discharged to the reservoir 16 such that the pressure of the wheel cylinder W/C is reduced. Then, when the wheel FL has recovered from its locked tendency, the pressure-reducing valve OUT/V(FL) is closed to maintain the pressure of wheel cylinder W/C.

Moreover, the pump P is properly operated, and also the pressure-amplifying valve IN/V(FL) is opened for a proper increase of pressure. The pump P functions to return the brake fluid which was discharged to the reservoir 16 at the time of pressure reduction, back to the brake circuit 10k.

Effects of Structure in Sixth Embodiment

In the sixth embodiment, the gear pump P is applied to the brake system for a vehicle. The gear pump P is rotated at the time of rotation request such as a presence of braking operation (when the pressure of the wheel cylinder W/C needs to be increased under the vehicle behavior control or when residual fluid within the reservoir 16, 26 is returned to the brake circuit 10k, 20k under the anti-skid control), and is stopped at the time of non-rotation request such as an absence of braking operation (when the pressure of the wheel cylinder W/C does not need to be increased).

Accordingly, even in the case where the rotations and stops of the gear pump P are frequently repeated so as to enlarge a pressure variation in the gear pump P, the jamming of the seal ring 170, 180 is prevented such that the durability can be improved.

Seventh Embodiment

Next, a seventh embodiment according to the present invention will be explained below. In the seventh embodiment; hydraulic circuits different from those in the sixth embodiment are used as the brake system for a vehicle.

Hydraulic Circuit of Brake System in Seventh Embodiment

Figure 45:
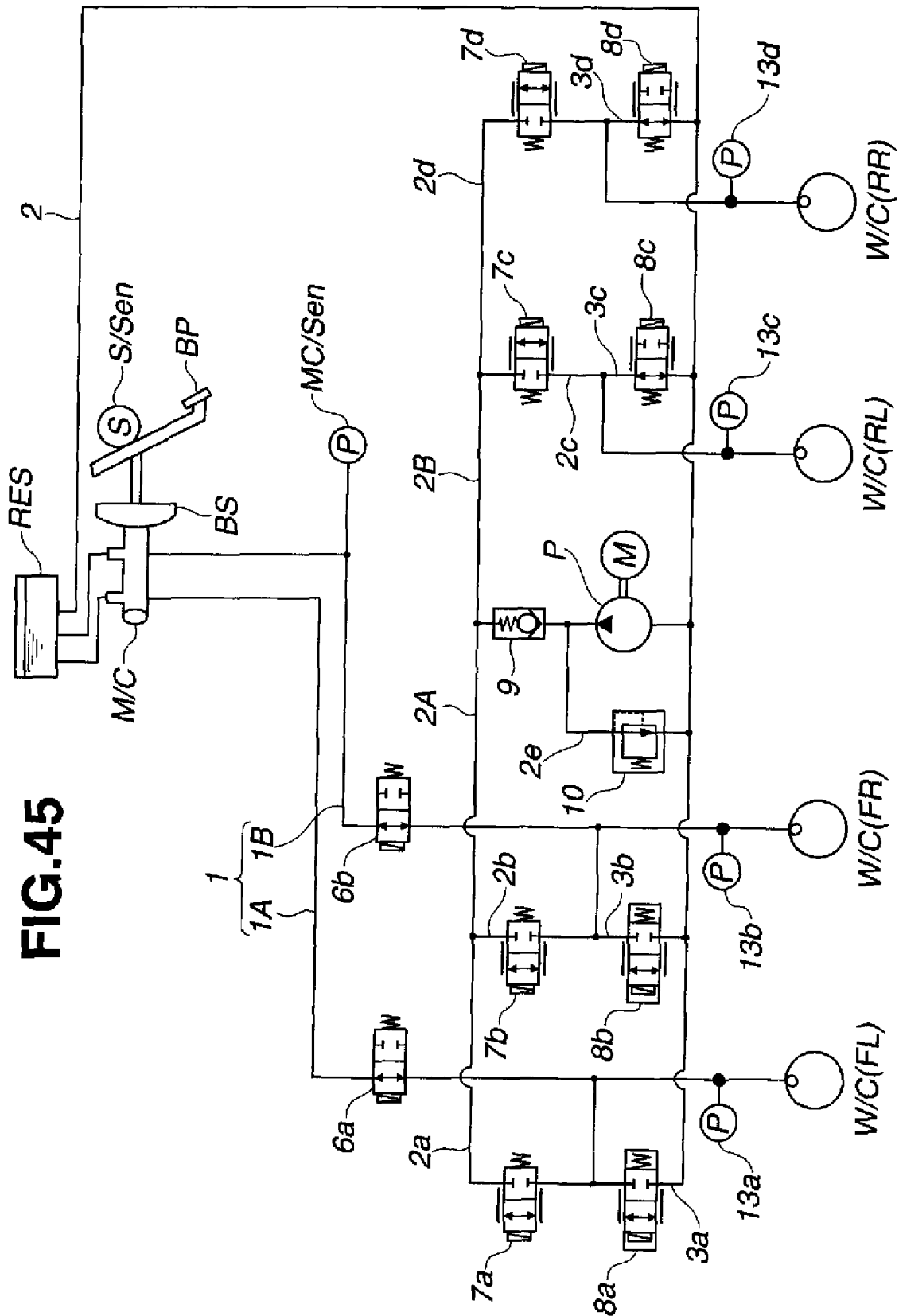
FIG. 45 is a configuration view of a hydraulic circuit to which the pump according to the present invention is applied.

FIG. 45 is a configuration view of hydraulic circuits of the brake system in the seventh embodiment.

The brake control system (apparatus) includes a master cylinder MC connected through a brake booster BS with a brake pedal BP, and a hydraulic control unit connected with the master cylinder MC. This hydraulic control unit serves to apply a pressure of the master cylinder MC to wheel cylinders W/C(FL) to W/C(RR) for respective wheels FL, FR, RL and RR of the vehicle. The hydraulic control unit includes the pump P, a plurality of solenoid valves 6 to 8, etc. The hydraulic control unit can attain the above-mentioned automatic brake control such as vehicle dynamics control (VDC) and the anti-lock brake system (ABS) control, in response to control commands.

Hereinafter, respective components (members) provided in correspondence with the four wheels FL, FR, RL and RR are distinguished from one another by appending signs a, b, c and d. That is, in the following explanations; the sign "a" represents a component (member) corresponding to the front-left wheel FL, the sign "b" represents a component corresponding to the front-right wheel FR, the sign "c" represents a component corresponding to the rear-left wheel RL, and the sign "d" represents a component corresponding to the rear-right wheel RR.

The hydraulic circuit can be divided into independent two channels (two lines), namely includes a first brake circuit 1 and a second brake circuit 2. The first brake circuit 1 is a normal brake circuit which connects the master cylinder MC, first pressure-amplifying control valves 6 and the wheel cylinders W/C(FL) and W/C(FR) with one another.

The second brake circuit 2 is a control brake circuit which connects a reservoir tank RES, the pump P, second pressure-amplifying control valves 7 and the wheel cylinders W/C(FL) to W/C(RR) with one another. A return circuit which connects the wheel cylinders W/C(FL) to W/C(RR), pressure-reducing control valves 8 and the reservoir tank RES with one another is provided so as to have oil passages partly common with the second brake circuit 2.

The brake pedal BP transmits a braking operation of driver to a brake booster BS. A stroke sensor S/Sen is attached to the brake pedal BP, and senses a stroke of the brake pedal BP.

The brake booster BS amplifies a force transmitted from the brake pedal BP e.g., by means of an engine negative pressure, and then transmits the amplified force to (a piston of) the master cylinder MC to operate the master cylinder MC. Thereby, the brake booster BS assists a pedal force of the driver. It is noted that an electric booster adapted to assist the brake operating force by means of a driving force of motor may be used as this brake booster BS.

The reservoir tank RES is a tandem-type reservoir tank for storing brake fluid. The reservoir tank RES is connected with the master cylinder MC and the second brake circuit 2. However, the reservoir tank RES according to the seventh embodiment is not limited to a tandem-type reservoir tank.

The master cylinder MC transforms a force transmitted from the brake booster BS to a fluid pressure, and thereby produces a master-cylinder pressure proportional to the force transmitted from the brake booster BS. The master cylinder MC is of tandem type, and includes two hydraulic chambers separated from each other by two master-cylinder pistons.

Each of the two hydraulic chambers independently receives a supply of brake fluid from the reservoir tank RES. One of the two hydraulic chambers is connected with a first brake circuit 1A which is one branch circuit of the first brake circuit 1. Another of the two hydraulic chambers is connected with a first brake circuit 1B which is another branch circuit of the first brake circuit 1. The first brake circuit 1A is for a channel of front wheels FL and FR, and the first brake circuit 1B is for a channel of rear wheels RL and RR.

The master cylinder MC includes two back pressure chambers separated from each other by the two master-cylinder pistons. These back pressure chambers respectively communicate with the reservoir tank RES.

When the brake pedal BP is depressed, the two master-cylinder pistons move along their stroke lines and thereby generate master-cylinder pressures equal to each other in the two hydraulic chambers. These master-cylinder pressures are supplied respectively to the first brake circuits 1A and 1B.

A seal member is provided on an outer circumferential surface of each master-cylinder piston. At the time of stroke of the pistons, this seal member blocks a communication between each hydraulic chamber and the reservoir tank RES, and thereby, an inside pressure of each hydraulic chamber can be increased.

At this time, brake fluid is not supplied from the reservoir tank RES to the first brake circuits 1A and 1B, but is supplied only from the hydraulic chambers of the mater cylinder MC to the first brake circuits 1A and 1B.

When regarding the side of reservoir tank RES as an upstream side and regarding the side of wheel cylinders W/C (FL) to W/C(RR) as a downstream side, the oil passages (first brake circuits) 1A and 1B are connected respectively with the wheel cylinders W/C(FL) and W/C(FR), downstream of the oil passages 1A and 1B. The first pressure-amplifying control valves 6a and 6b are provided respectively on the oil passages 1A and 1B.

On the oil passage 1B located upstream of the first pressure-amplifying control valve 6b, a master-cylinder pressure sensor MC/Sen is provided. The master-cylinder pressure sensor MC/Sen serves to sense the pressure of the master cylinder MC.

Each first pressure-amplifying control valve 6 is a solenoid valve of normally-closed type. More specifically, each first pressure-amplifying control valve 6 is a so-called proportional valve whose valve opening varies proportionally with an electric-current value flowing through a coil. The second pressure-amplifying control valves 7a to 7d are opened or closed so as to respectively open or close the oil passages 2a to 2d by command electric-currents.

When the master-cylinder pressure is higher than the pressure (wheel-cylinder pressure) of the wheel cylinder W/C (FL) to W/C(RR), the master-cylinder pressure is supplied to the wheel cylinder W/C(FL) to W/C(RR) by opening the first pressure-amplifying control valve 6a, 6b. Then, this supply is blocked or stopped by closing the first pressure-amplifying control valve 6a, 6b. On the other hand, the wheel-cylinder pressure is higher than the master-cylinder pressure, the wheel-cylinder pressure is supplied to the master cylinder MC by opening the first pressure-amplifying control valve 6a, 6b. Then, this supply is blocked or stopped by closing the first pressure-amplifying control valve 6a, 6b.

Wheel-cylinder pressure sensors 13a to 13d respectively sense the pressures (wheel-cylinder pressures) of the wheel cylinders W/C(FL) to W/C(RR). In case that any of the wheel cylinders W/C(FL) to W/C(RR) causes a brake failure; this brake failure is detected by the wheel-cylinder pressure sensors 13a to 13d, and then the second pressure-amplifying control valve 7a to 7d corresponding to the wheel having this failure is closed.

A downstream side of the second brake circuit 2 connected with the reservoir tank RES is connected with the pump P. The pump P supplies brake fluid sucked up from the reservoir tank RES to the downstream side (i.e., to the second pressure-amplifying control valves 7a to 7d) under high pressure.

A motor M is of electrical type, and drives the pump P. It is noted that the pump P according the seventh embodiment may be driven by using a drive source other than the motor M (i.e., not limited to the electrical motor M).

On the second brake circuit 2 located downward of the pump P, a check valve 9 is provided for prevent a flow of brake fluid from the downstream side to the upstream side.

The second brake circuit 2 branches into (is divided into) a second brake circuit 2A and a second brake circuit 2B at a point located downstream of the check valve 9. A downstream side of the second brake circuit 2A branches into the oil passages 2a and 2b.

In the same manner, a downstream side of the second brake circuit 2B branches into the oil passages 2c and 2d. The oil passages 2a to 2d are connected respectively with the wheel cylinders W/C(FL) to W/C(RR). The second pressure-amplifying control valves 7a to 7d are provided respectively on the oil passages 2a to 2d.

Each of the second pressure-amplifying control valves 7a to 7d is a proportional solenoid valve of normally-closed type, and serves to open or close the oil passage 2a to 2d. By opening the second pressure-amplifying control valve 7a to 7d, the pump pressure is supplied to the wheel cylinder W/C (FL) to W/C(RR). Then, this supply is blocked by closing the second pressure-amplifying control valve 7a to 7d.

The oil passages 2a to 2d are respectively connected with oil passages 3a to 3d, at points downstream of the second pressure-amplifying control valves 7a to 7d. The oil passages 3a to 3d are connected with the second brake circuit 2 located upstream of the pump P, namely are connected through the second brake circuit 2 to the reservoir tank RES.

The pressure-reducing control valves 8a to 8d are provided respectively on the oil passages 3a to 3d. Thereby, the return circuit is constructed in which brake fluid is returned from the wheel cylinder W/C(FL) to W/C(RR) to the reservoir tank RES by a route of "wheel cylinder W/C(FL) to W/C(RR) pressure-reducing control valve 8a to 8d reservoir tank RES".

Each of the pressure-reducing control valves 8a to 8d is a proportional solenoid valve. The pressure-reducing control valves 8a and 8b for front wheels are of normally-closed type, and the pressure-reducing control valves 8c and 8d for rear wheels are of normally-open type. The pressure-reducing control valves 8a to 8d are opened or closed by command electric-currents so as to respectively open or block the oil passages 3a to 3d. By opening the pressure-reducing control valve 8a to 8d, brake fluid is returned from the wheel cylinder W/C(FL) to W/C(RR) toward the reservoir tank RES so that the wheel-cylinder pressure is reduced. Under the state where the pressure-reducing control valve 8a to 8d remains closed, each wheel-cylinder pressure is not reduced.

An oil passage 2e for relief is connected with a point between the pump P and the check valve 9 in the second brake circuit 2. The oil passage 2e is connected with (any of) the oil passages 3a to 3d, upstream of the pressure-reducing control valves 8a and 8b. Thereby, the oil passage 2e is connected through the oil passage 3a to 3d and the second brake circuit 2 with the reservoir tank RES. It is noted that the oil passage 2e according the seventh embodiment may be directly connected with the second brake circuit 2, upstream of the pump P.

Moreover, a relief valve 10 is provided on the oil passage 2e. When the pump pressure becomes greater than or equal to a predetermined value (e.g., a predetermined withstand pressure of this hydraulic circuit), the relief valve 10 is opened to communicate a discharge side of the pump P with the reservoir tank RES. Thereby, the pump pressure is released to the reservoir tank RES so that the pump pressure is prevented from becoming greater than or equal to the predetermined value.

Effects in Seventh Embodiment

The seventh embodiment can also produce the similar effects and advantages as the sixth embodiment according to the present invention.

Other Embodiments

Although the invention has been described above with reference to certain embodiments of the invention, the invention is not limited to the embodiments described above. Modifications and variations of the embodiments described above will occur to those skilled in the art in light of the above teachings.

This application is based on prior Japanese Patent Application No. 2008-063602 filed on Mar. 13, 2008. The entire contents of this Japanese Patent Application are hereby incorporated by reference.

The scope of the invention is defined with reference to the following claims.

What is claimed is:

1. A seal apparatus of a gear pump, comprising:
at least one pair of gears meshing with each other;
a side plate arranged adjacent to the pair of gears;
a housing sandwiching the side plate and arranged to be opposed to the pair of gears, at least one of the side plate and the housing comprising a shoulder portion;
a seal member arranged between the housing and the side plate and arranged at the shoulder portion, the seal member separating a low pressure area from a high pressure area in a radial direction of one of the gears, the shoulder portion being located in the low pressure area, at least a part of the seal member facing the high pressure area;
a backup member reinforcing the seal member and facing a tip portion of the shoulder portion; and
a containing portion formed between a root portion of the shoulder portion and the seal member to contain a part of the seal member at least when the seal member is elastically deformed,
wherein the seal member is substantially in a shape of a ring,
wherein the low pressure area is separated from the high pressure area by using radially inside and outside areas of the ring-shaped seal member as the low pressure area and the high pressure area.

2. The seal apparatus as claimed in claim 1, wherein
the seal member is substantially in a shape of an L in cross section; and
the backup member is in a shape of a ring substantially same as the shape of the seal member, and is located inside a groove of the seal member which forms the substantially L-shaped cross section of the seal member.

3. The seal apparatus as claimed in claim 2, wherein
the seal member and the backup member are formed as separate members from each other.

4. The seal apparatus as claimed in claim 3, wherein the backup member is integrally attached to the seal member.

5. The seal apparatus as claimed in claim 4, wherein
the seal member and the backup member respectively comprise engaging portions at which the backup member engages with the seal member; and
the backup member is integrated with the seal member by the engaging portions of the seal member and the backup member.

6. The seal apparatus as claimed in claim 2, wherein
the seal member is in contact with the shoulder portion through a predetermined plurality of points in a circumferential direction of the ring-shaped seal member, each of the plurality of points having a predetermined tightening contact width in the circumferential direction.

7. The seal apparatus as claimed in claim 1, wherein
the containing portion is a clearance formed between the seal member and the shoulder portion.

8. The seal apparatus as claimed in claim 7, wherein
clearances exist between the seal member and the shoulder portion and between the backup member and the shoulder portion, at least when the high pressure area has a pressure level lower than or equal to a pressure level of the low pressure area; and
the seal member and the backup member are configured to move toward the shoulder portion and thereby the backup member becomes in contact with the shoulder portion earlier than the seal member, when the pressure level of the high pressure area becomes higher than the pressure level of the low pressure area.

9. The seal apparatus as claimed in claim 7, wherein
the seal member comprises a movement restricting portion that restricts a movement of the seal member toward the shoulder portion.

10. The seal apparatus as claimed in claim 1, wherein
the seal member is formed in cross section in a rectangular shape having a chamfer portion given by chamfering one diagonal corner of the rectangular shape; and
the backup member is substantially in a shape of a triangle in cross section, and is provided on the chamfer portion of the seal member.

11. The seal apparatus as claimed in claim 1, wherein
the containing portion is provided in the seal member by forming the seal member with a deformation-permissible concave portion exposed to the low pressure area.

12. The seal apparatus as claimed in claim 1, wherein
the seal member is configured to apply an elastic force at least to the backup member.

13. The seal apparatus as claimed in claim 1, wherein
the gear pump is configured to be applied to a brake system for a vehicle; and the gear pump is configured to be rotated at a time of rotation request, and is stopped at a time of non-rotation request.

14. A seal apparatus of a gear pump, comprising:

at least one pair of gears meshing with each other;

a side plate arranged adjacent to the pair of gears, the side plate comprising a shoulder portion;

a housing sandwiching the side plate and arranged to be opposed to the pair of gears;

a seal member arranged between the housing and the side plate and arranged at the shoulder portion, the seal member separating a low pressure area from a high pressure area in a radial direction of one of the gears; and a backup member reinforcing the seal member and arranged depending on a space formed between the housing and a tip portion of the shoulder portion, the backup member being configured to being elastically deformed by an elastic force of the seal member and thereby being pressed at least in a direction toward the housing and a direction toward a space formed between the backup member and the tip portion of the shoulder portion.

15. The seal apparatus as claimed in claim 14, wherein the seal member is substantially in a shape of a ring, and is substantially in a shape of an L in cross section;

the low pressure area is separated from the high pressure area by using inside and outside of the ring-shaped seal member as the low pressure area and the high pressure area; and the backup member is in a shape of a ring substantially same as the shape of the seal member, and is located inside a groove of the seal member which forms the substantially L-shaped cross section of the seal member.

16. The seal apparatus as claimed in claim 15, wherein a containing portion is formed between a root portion of the shoulder portion and the seal member to be capable of containing a part of the seal member at least when the seal member is elastically deformed; and the containing portion is a clearance formed between the seal member and the shoulder portion.

17. The seal apparatus as claimed in claim 16, wherein the seal member and the backup member are formed as separate members from each other.

18. The seal apparatus as claimed in claim 17, wherein the backup member is fitted to the seal member under a state integrated with the seal member.

19. The seal apparatus as claimed in claim 16, wherein clearances exist between the seal member and the shoulder portion and between the backup member and the shoulder portion, at least when the high pressure area has a pressure level lower than or equal to a pressure level of the low pressure area; and the seal member and the backup member are configured to move toward the shoulder portion and thereby the backup member becomes in contact with the shoulder portion earlier than the seal member, when the pressure level of the high pressure area becomes higher than the pressure level of the low pressure area.

20. The seal apparatus as claimed in claim 14, wherein the gear pump is configured to be applied to a brake system for a vehicle; and the gear pump is configured to be rotated at a time of rotation request, and is stopped at a time of non-rotation request.

21. A seal apparatus of a gear pump, comprising:

a seal member attached to a member constituting the gear pump, the seal member being formed substantially in an L shape in cross section; and a backup ring provided in a groove of the seal member which forms the substantially L-shaped cross section of the seal member, the backup ring reinforcing the seal member, wherein the backup ring is arranged to face a low pressure area of the gear pump, wherein the seal member is substantially in a shape of a ring, wherein the low pressure area is separated from a high pressure area by using radially inside and outside areas of the ring-shaped seal member as the low pressure area and the high pressure area.

22. The seal apparatus as claimed in claim 21, wherein the backup ring is pressed toward the low pressure area by a discharge pressure of the gear pump at a time of an operation of the gear pump.

23. The seal apparatus as claimed in claim 21, wherein the gear pump is configured to be applied to a brake system for a vehicle; the gear pump is configured to be rotated at least when a driver requires a braking and when it is determined that a wheel cylinder pressure needs to be increased according to a running state of the vehicle; and the gear pump is configured to be stopped when it is determined that the wheel cylinder pressure does not need to be increased according to the running state of the vehicle.

* * * * *